(12) United States Patent
Narala et al.

(10) Patent No.: US 11,625,064 B2
(45) Date of Patent: Apr. 11, 2023

(54) SYSTEMS AND METHODS FOR SLEEP CLOCK EDGE-BASED GLOBAL COUNTER SYNCHRONIZATION IN A CHIPLET SYSTEM

(71) Applicant: QUALCOMM Incorporated, San Diego, CA (US)

(72) Inventors: Naveen Kumar Narala, Bengaluru (IN); Matthew Severson, Austin, TX (US); Haobo Zhao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 17/402,884

(22) Filed: Aug. 16, 2021

(65) Prior Publication Data

US 2023/0046542 A1  Feb. 16, 2023

(51) Int. Cl.
  *G06F 1/12*    (2006.01)
  *G06F 1/10*    (2006.01)
  *G06F 1/32*    (2019.01)
  *G06F 1/3206*  (2019.01)

(52) U.S. Cl.
  CPC .......... *G06F 1/12* (2013.01); *G06F 1/10* (2013.01); *G06F 1/3206* (2013.01)

(58) Field of Classification Search
  CPC ............ G06F 1/10; G06F 1/12; G06F 1/3206
  See application file for complete search history.

(56) References Cited

U.S. PATENT DOCUMENTS 10,172,092 B1 * 1/2019 Zhou ................. G06F 1/08
10,691,576 B1   6/2020 Shapira et al.

2011/0148850 A1 * 6/2011 Kadota ............... G09G 3/3685
                                                    345/87

FOREIGN PATENT DOCUMENTS

WO    2017099861 A1    6/2017

OTHER PUBLICATIONS

MIPI Alliance, MIPI System Power Management Interface (Year: 2012).*
International Search Report and Written Opinion—PCT/US2022/036642—ISA/EPO—dated Nov. 10, 2022.

* cited by examiner

*Primary Examiner* — Stefan Stoynov
(74) *Attorney, Agent, or Firm* — The Marbury Law Group/Qualcomm

(57) ABSTRACT

Various embodiments include methods and systems for providing sleep clock edge-based global counter synchronization in a multiple-chiplet system. A system-on-a-chip (SoC) may include a first chiplet including a first chiplet global counter subsystem, and a second chiplet including a second chiplet global counter subsystem. The SoC may further include an interface bus communicatively coupling the first chiplet and the second chiplet, and a power management integrated circuit (PMIC) configured to supply a sleep clock to the first chiplet and the second chiplet. The first chiplet may be configured to transmit a global counter synchronization pulse trigger to the second chiplet across the interface bus. The second chiplet may be configured to load a global counter synchronization value into the second chiplet global counter subsystem at a sleep clock synchronization edge of the sleep clock in response to receiving the global counter synchronization pulse trigger.

31 Claims, 12 Drawing Sheets

SYSTEMS AND METHODS FOR SLEEP CLOCK EDGE-BASED GLOBAL COUNTER SYNCHRONIZATION IN A CHIPLET SYSTEM

BACKGROUND

To accommodate increasing complexity and capabilities in integrated circuits used in a variety of computing and communication devices, computing chips are increasingly being implemented in a piecewise manner. For example, processing devices and large-scale integrated circuits may include multiple "chiplets" that may be used together to perform joined tasks and processes.

Synchronization of these processes has been increasingly difficult as processing speeds increase. As processing speeds increase, the chance for errors to occur and create vulnerabilities to malicious attacks may also increase.

As a result, there is an increased need for synchronizing chiplets within a multiple-chiplet system to better isolate and identify any such errors that may occur on one or all chiplets within a multiple-chiplet system.

SUMMARY

Various aspects include methods and devices for providing global counter synchronization within a multiple-chiplet system using a rising edge of a sleep clock. In various aspects, a master chiplet may be configured to transmit a global counter synchronization pulse trigger to a slave chiplet across an interface bus, and in response, the slave chiplet may be configured to load a global counter synchronization value into a slave chiplet global counter subsystem at a sleep clock synchronization edge of the sleep clock.

Some aspects may include a first chiplet including a first chiplet global counter subsystem, a second chiplet including a second chiplet global counter subsystem, an interface bus communicatively coupling the first chiplet and the second chiplet, and a power management integrated circuit (PMIC) configured to supply a sleep clock to the first chiplet and the second chiplet, in which: the first chiplet is configured to transmit a global counter synchronization pulse trigger to the second chiplet across the interface bus; and the second chiplet is configured to load a global counter synchronization value into the second chiplet global counter subsystem at a sleep clock synchronization edge of the sleep clock in response to receiving the global counter synchronization pulse trigger.

In some aspects, the first chiplet may be further configured to: read a first chiplet global counter value from the first chiplet global counter subsystem; generate the global counter synchronization value based on the first chiplet global counter value; and transmit the global counter synchronization value to the second chiplet across the interface bus; and the second chiplet may be further configured to store the global counter synchronization value in a preload register, in which the global counter synchronization value is loaded into the second chiplet global counter subsystem from the preload register.

In some aspects, the first chiplet global counter value may be read from the first chiplet global counter subsystem at a rising edge of the sleep clock. In some aspects, the first chiplet may be further configured to determine the sleep clock synchronization edge of the sleep clock, in which the sleep clock synchronization edge is a rising edge of the sleep clock. In some aspects, the first chiplet may be further configured to transmit the global counter synchronization pulse trigger to the second chiplet one sleep clock cycle before the sleep clock synchronization edge of the sleep clock. In some aspects, the first chiplet may be further configured to transmit the global counter synchronization pulse trigger to the second chiplet at a delayed time between the sleep clock synchronization edge and one sleep clock cycle before the sleep clock synchronization edge.

In some aspects, the first chiplet may be further configured to transmit a reset assertion to the second chiplet; and the second chiplet may be further configured to transmit a global counter synchronization request to the first chiplet across the interface bus in response to the reset assertion, in which the first chiplet is configured to transmit the global counter synchronization pulse trigger to the second chiplet across the interface bus in response to the first chiplet receiving the global counter synchronization request from the second chiplet.

In some aspects, the second chiplet may be further configured to: disable a global counter halt within the second chiplet global counter subsystem, in which disabling the global counter halt reinitiates counting of a second chiplet global counter within the second chiplet global counter subsystem; and enable a global counter synchronization path within the second chiplet global counter subsystem, in which enabling the global counter synchronization path allows the first chiplet global counter subsystem to communicate with the second chiplet global counter subsystem.

In some aspects, the first chiplet may be further configured to disable a global counter halt within the first chiplet global counter subsystem and the second chiplet global counter subsystem, in which disabling the global counter halt reinitiates counting of a first chiplet global counter within the first chiplet global counter subsystem and reinitiates counting of a second chiplet global counter within the second chiplet global counter subsystem; and the second chiplet may be further configured to enable a global counter synchronization path within the second chiplet global counter subsystem, in which enabling the global counter synchronization path allows the first chiplet global counter subsystem to communicate with the second chiplet global counter subsystem.

In some aspects, a sleep clock skew between the first chiplet and the second chiplet may be equal to or less than two crystal oscillator clock cycles, in which the sleep clock may be distributed to the first chiplet and the second chiplet in a star configuration. In some aspects, the interface bus may be a system power management interface (SPMI) bus.

Some aspects may further include a third chiplet including a third chiplet global counter subsystem, in which the interface bus communicatively couples the first chiplet and the third chiplet; and in which: the first chiplet may be further configured to transmit the global counter synchronization pulse trigger to the third chiplet across the interface bus; and the third chiplet may be configured to load the global counter synchronization value into the third chiplet global counter subsystem at the sleep clock synchronization edge of the sleep clock in response to receiving the global counter synchronization pulse trigger.

Further aspects may further include a method for global counter synchronization within a multiple-chiplet system. Such aspects may include: supplying, via a PMIC, a sleep clock to a first chiplet and a second chiplet; transmitting a global counter synchronization pulse trigger from the first chiplet to the second chiplet; and loading a global counter synchronization value into a second chiplet global counter subsystem at a sleep clock synchronization edge of the sleep clock in response to the second chiplet receiving the global counter synchronization pulse trigger.

Some aspects may further include reading, by the first chiplet, a first chiplet global counter value from a first chiplet global counter subsystem; generating, by the first chiplet, the global counter synchronization value based on the first chiplet global counter value; transmitting the global counter synchronization value from the first chiplet to the second chiplet; and storing the global counter synchronization value in a preload register of the second chiplet, in which the global counter synchronization value is loaded into the second chiplet global counter subsystem from the preload register. In some aspects, the first chiplet global counter value may be read from the first chiplet global counter subsystem at a rising edge of the sleep clock.

Some aspects may further include determining, by the first chiplet, the sleep clock synchronization edge of the sleep clock, in which the sleep clock synchronization edge is a rising edge of the sleep clock. Some aspects may further include transmitting the global counter synchronization pulse trigger from the first chiplet to the second chiplet one sleep clock cycle before the sleep clock synchronization edge of the sleep clock. Some aspects may further include transmitting the global counter synchronization pulse trigger from the first chiplet to the second chiplet at a delayed time between the sleep clock synchronization edge and one sleep clock cycle before the sleep clock synchronization edge.

Some aspects may further include transmitting a reset assertion from the first chiplet to the second chiplet; and transmitting a global counter synchronization request from the second chiplet to the first chiplet in response to the reset assertion, in which transmitting the global counter synchronization pulse trigger from the first chiplet to the second chiplet is performed in response to the first chiplet receiving the global counter synchronization request from the second chiplet.

Some aspects may further include disabling, by the second chiplet, a global counter halt within the second chiplet global counter subsystem, in which disabling the global counter halt reinitiates counting of a second chiplet global counter within the second chiplet global counter subsystem; and enabling, by the second chiplet, a global counter synchronization path within the second chiplet global counter subsystem, in which enabling the global counter synchronization path allows a first chiplet global counter subsystem to communicate with the second chiplet global counter subsystem.

Some aspects may further include disabling, by the first chiplet, a global counter halt within a first chiplet global counter subsystem and the second chiplet global counter subsystem, in which disabling the global counter halt reinitiates counting of a first chiplet global counter within the first chiplet global counter subsystem and reinitiates counting of a second chiplet global counter within the second chiplet global counter subsystem; and enabling, by the second chiplet, a global counter synchronization path within the second chiplet global counter subsystem, in which enabling the global counter synchronization path allows the first chiplet global counter subsystem to communicate with the second chiplet global counter subsystem.

Further aspects may include an SoC, including: a first chiplet including a first chiplet global counter subsystem; a second chiplet including a second chiplet global counter subsystem; means for suppling a sleep clock to the first chiplet and the second chiplet; means for transmitting a global counter synchronization pulse trigger from the first chiplet to the second chiplet; and means for loading a global counter synchronization value into the second chiplet global counter subsystem at a sleep clock synchronization edge of the sleep clock in response to the second chiplet receiving the global counter synchronization pulse trigger.

Some aspects may further include means for reading a first chiplet global counter value from the first chiplet global counter subsystem; means for generating the global counter synchronization value based on the first chiplet global counter value; means for transmitting the global counter synchronization value from the first chiplet to the second chiplet; and means for storing the global counter synchronization value in a preload register of the second chiplet, in which the global counter synchronization value is loaded into the second chiplet global counter subsystem from the preload register.

In some aspects, the first chiplet global counter value is read from the first chiplet global counter subsystem at a rising edge of the sleep clock. Some aspects may further include means for determining the sleep clock synchronization edge of the sleep clock, in which the sleep clock synchronization edge is a rising edge of the sleep clock. Some aspects may further include means for transmitting the global counter synchronization pulse trigger from the first chiplet to the second chiplet one sleep clock cycle before the sleep clock synchronization edge of the sleep clock. Some aspects may further include means for transmitting the global counter synchronization pulse trigger from the first chiplet to the second chiplet at a delayed time between the sleep clock synchronization edge and one sleep clock cycle before the sleep clock synchronization edge.

Some aspects may further include means for transmitting a reset assertion from the first chiplet to the second chiplet; and means for transmitting a global counter synchronization request from the second chiplet to the first chiplet in response to the reset assertion, in which means for transmitting the global counter synchronization pulse trigger from the first chiplet to the second chiplet is in response to the first chiplet receiving the global counter synchronization request from the second chiplet. Some aspects may further include means for disabling a global counter halt within the second chiplet global counter subsystem, in which disabling the global counter halt reinitiates counting of a second chiplet global counter within the second chiplet global counter subsystem; and means for enabling a global counter synchronization path within the second chiplet global counter subsystem, in which enabling the global counter synchronization path allows the first chiplet global counter subsystem to communicate with the second chiplet global counter subsystem.

Some aspects may further include means for disabling a global counter halt within the first chiplet global counter subsystem and the second chiplet global counter subsystem, in which disabling the global counter halt reinitiates counting of a first chiplet global counter within the first chiplet global counter subsystem and reinitiates counting of a second chiplet global counter within the second chiplet global counter subsystem; and means for enabling a global counter synchronization path within the second chiplet global counter subsystem, in which enabling the global counter synchronization path allows the first chiplet global counter subsystem to communicate with the second chiplet global counter subsystem.

Further aspects include a method for global counter synchronization implemented by a first chiplet within a multiple-chiplet system, including: receiving, from a PMIC, a sleep clock; and transmitting a global counter synchronization pulse trigger to a second chiplet; in which the global counter synchronization pulse trigger is configured to cause the second chiplet to load a global counter synchronization value into a second chiplet global counter subsystem at a sleep clock synchronization edge of the sleep clock. Some aspects may further include reading a first chiplet global counter value from a first chiplet global counter subsystem; generating the global counter synchronization value based on the first chiplet global counter value; and transmitting the global counter synchronization value to the second chiplet.

Further aspects include an SOC, including a first chiplet including a first chiplet global counter subsystem; a second chiplet including a second chiplet global counter subsystem; an interface bus communicatively coupling the first chiplet and the second chiplet; and a PMIC configured to supply a sleep clock to the first chiplet and the second chiplet, in which the first chiplet is configured to receive a sleep clock from the PMIC, and transmit a global counter synchronization pulse trigger to the second chiplet, in which the global counter synchronization pulse trigger is configured to cause the second chiplet to load a global counter synchronization value into a second chiplet global counter subsystem at a sleep clock synchronization edge of the sleep clock. In some aspects, the first chiplet may be further configured to: read a first chiplet global counter value from a first chiplet global counter subsystem; generate the global counter synchronization value based on the first chiplet global counter value; and transmit the global counter synchronization value to the second chiplet.

BRIEF DESCRIPTION OF THE DRAWINGS

The accompanying drawings, which are incorporated herein and constitute part of this specification, illustrate example embodiments, and together with the general description given above and the detailed description given below, serve to explain the features of the various embodiments.

DETAILED DESCRIPTION

Figure 1:
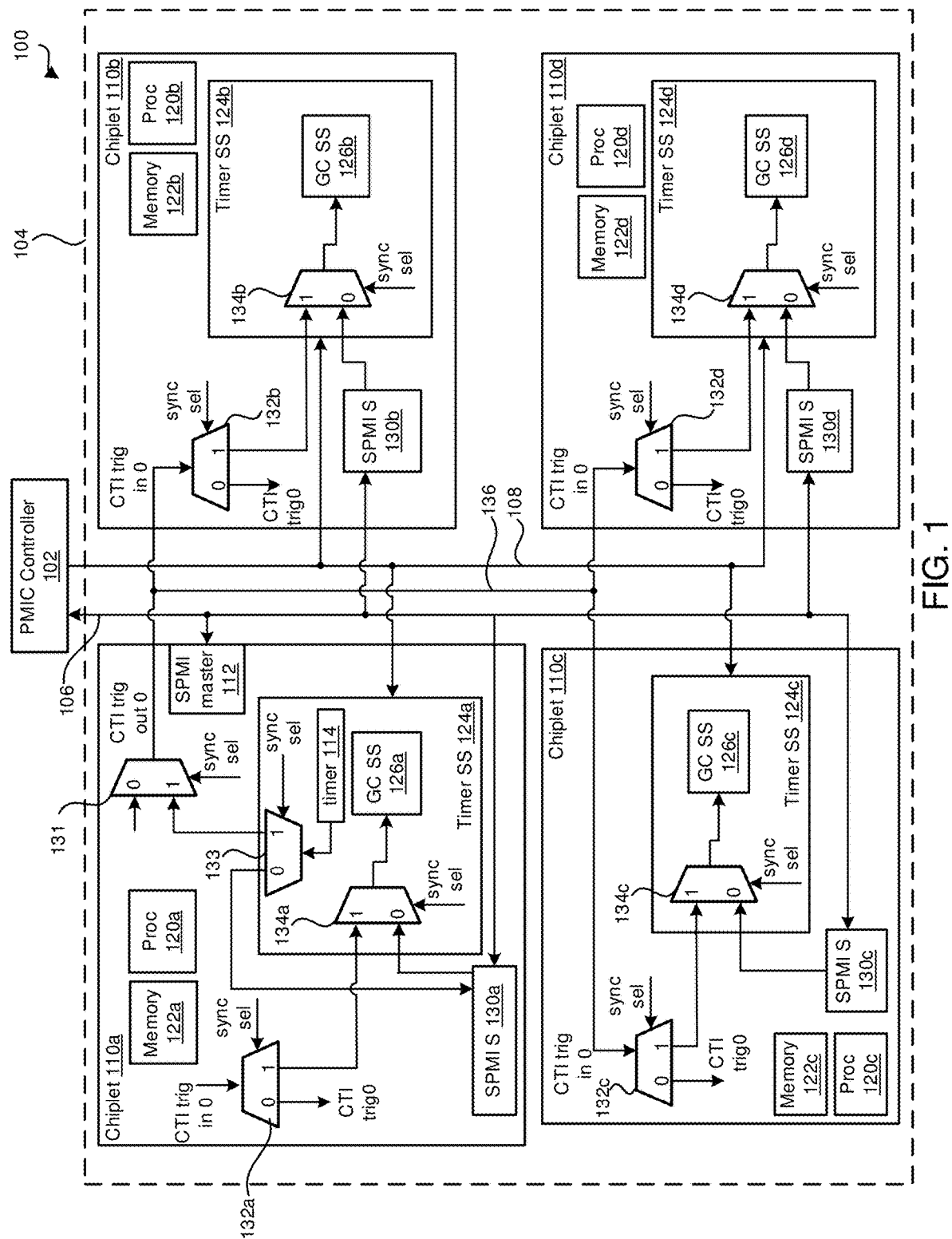
FIG. 1 is a component block diagram illustrating an example of multiple-chiplet system circuitry suitable for implementing various embodiments.

The various embodiments will be described in detail with reference to the accompanying drawings. Wherever possible, the same reference numbers will be used throughout the drawings to refer to the same or like parts.

References made to particular examples and implementations are for illustrative purposes, and are not intended to limit the scope of the claims.

Various embodiments provide a hardware-based global counter synchronization solution within a multiple-chiplet system utilizing sleep clock edge-based global counter synchronization methods. Various embodiments may be implemented in a system-on-a-chip (SoC) or similar system that includes multiple chiplets, each including a chiplet global counter subsystem, that are coupled to an interface bus and a power management integrated circuit (PMIC) configured to supply a sleep clock to the first chiplet and the second chiplet. A first chiplet may transmit a global counter synchronization pulse trigger to a second chiplet across the interface bus, and in response, the second chiplet may load a global counter synchronization value into the second chiplet global counter subsystem at a sleep clock synchronization edge of the sleep clock.

The terms "system-on-a-chip" and SoC are used herein to refer to a single integrated circuit (IC) chip that contains multiple resources or processors integrated on a single substrate. A single SoC may contain circuitry for digital, analog, mixed-signal, and radio-frequency functions. A single SoC also may include any number of general purpose or specialized processors (digital signal processors, modem processors, video processors, etc.), memory blocks (such as ROM, RAM, Flash, etc.), and resources (such as timers, voltage regulators, oscillators, etc.). SoCs also may include software for controlling the integrated resources and processors, as well as for controlling peripheral devices.

The term "system-in-a-package" (SIP) is used herein to refer to a single module or package that contains multiple resources, computational units, cores or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SoCs coupled together via high-speed communication circuitry and packaged in close proximity, such as on a single motherboard or in a single wireless device. The proximity of the SoCs facilitates high speed communications and the sharing of memory and resources.

The term "function block" is used herein to refer to a grouping of one or more electronic circuit components useable to perform various functions. In various embodiments, a function block may include components useable to perform functions related to secure timer synchronization between the function block and one or more external components. A function block may include various hardware, software, and/or firmware to implement various embodiments. For example, a function block may be or include an SoC, SIP, NOC, and various subsystems. A function block may include various clocking components, memory registers, logic gating bus interfaces, multiplexors, and other electrical components to implement various embodiments for secure timer synchronization.

As used herein, the term "chiplet" is used to refer to a sub-processing unit or sub-processing device within a processing system, such as an SoC. A chiplet may be an integrated circuit block designed to work with other similar chiplets within a processing system to execute various processes. A chiplet may be a separate die operating independently from other dies within a larger processing system, such as an SoC, or may be a separate die operating in conjunction with other dies within a larger processing system. A chiplet may include one or more processing cores to execute system processes in conjunction with other cores of associated chiplets within a system. A chiplet may include input/output (IO) functionality to communicate system data with other chiplets and/or other system devices, such as memory, power controllers, IO controllers and/or interfaces, and the like. A chiplet may function as, and may be referred to, as a function block that performs processing operations within a system, such as an SoC.

Computing devices and systems are increasingly being implemented in a piecewise manner. Multiple-chiplet systems continuously require improved yield and scalability as technology progresses and processing speeds become faster. Synchronization of these processes has been increasingly difficult as processing speeds increase. As processing speeds increase, the chance for errors to occur and create vulnerabilities to malicious attacks may also increase. As a result, there is an increased need for synchronizing chiplets. Reducing latency both during a synchronization process and when performing debugging processes based on the timestamps derived from the synchronized processes within a multiple-chiplet system may better isolate and identify any such errors that may occur on one or more chiplets working together within a multiple-chiplet system.

In a multiple-chiplet system, a master die, or chiplet, may be used to control, regulate, or otherwise instruct any number of associated slave dies, or chiplets, in electrical communication with the master chiplet. The master chiplet may share at least one clock signal with the slave chiplets, such that the shared clock signal may be derived from the same source (e.g., PMIC crystal oscillator). For debugging purposes, it is helpful for any errors to occur within any of the chiplets in a multiple-chiplet system to be timestamped correctly, such that there is a minimized amount of skew between timestamped events in one chiplet that may be associated with other timestamped events in another chiplet. If the clock synchronization between the chiplets is too skewed or is unsynchronized, the timestamps for any time-stamped events, including recorded hardware and/or software errors, may not be able to be associated correctly with corresponding timestamped events recorded among other chiplets, and may therefore be useless in terms of accurately identifying an error, malicious attack, or for purposes of initiating a corrective process. Thus, clock synchronization between chiplets within a multiple-chiplet system is important for basic system operation.

Clock misalignment, or desynchronization, may be caused by a variety of reasons within a multiple-chiplet system. At system bootup, the master chiplet may be unsynchronized with any slave chiplets, and may require clock, or global counter, synchronization. Specifically, the master chiplet may reset the slave chiplets at system boot in a staggered manner, such that each slave chiplet clock and/or global counter is misaligned with each additional slave chiplet clock.

As another example, each chiplet uses its local global counter time base for functionality and debug traces. The global counter of a master chiplet or a slave chiplet is reset whenever the chiplet is reset. Thus, the master chiplet may crash, and a PMIC may provide a reset signal, message, or assertion, to the master chiplet. The master chiplet global counter, having been reset, may therefore be out of synchronization with the slave chiplet global counters.

Similarly, a slave chiplet may crash, and the master chiplet may provide a reset assertion to the slave chiplet. The slave chiplet global counter, having been reset, may therefore be out of synchronization with the master chiplet global counter as well as other slave chiplet global counters.

As a further example for when global counter desynchronization occurs, global counters of the master chiplet and any slave chiplets may be halted during cross trigger interface (CTI) operations and communications. A CTI trigger may halt a slave chiplet global counter, causing the slave chiplet global counter to freeze and misalign with global counters still running in other chiplets. In the case of a CTI trigger halting a master chiplet global counter, the same CTI halt trigger also stops global counters in all slave chiplets. Thus, all chiplets would need to be resynchronized again.

Lack of low-latency global counter synchronization may cause a variety of system performance issues, such as during debugging processes. Multiple-chiplet systems, such as those implementing a CoreSight CTI, require a common time base to trace time stamps collected and aggregated from all associated system chiplets. Global counter synchronization is also critical for multiple-chiplet system normal operations, such as chip-to-chip or device-to-device operations and communications that require accurate time-stamped messaging. Synchronization accuracy may also suffer with software-based synchronization solutions. Global counter synchronization faster than the microsecond ($\mu s$) scale may be desirable in multiple-chiplet systems to enable accurate timelines across all associated chiplets, since a microsecond is a significant period when chiplet processors are operating at GHz rates.

Software-based global counter synchronization is on the order of a µs scale due to the chip-to-chip latency and interrupt latency. Thus, a hardware-based global counter synchronization solution may be utilized to improve global counter synchronization latency.

Various embodiments provide a hardware-based global counter synchronization solution within a multiple-chiplet system. A multiple-chiplet system may include a master chiplet and one or more slave chiplets. A sleep clock (e.g., 32 kHz) derived from an active clock (e.g., 19.2 MHz) may be distributed to each of the chiplets within the multiple-chiplet system. Rising edges of the sleep clock may be utilized by the master chiplet to (i) read the master chiplet global counter, (ii) determine which future sleep clock rising edge should be utilized to synchronize with any slave chiplet, (iii) determine a global counter synchronization value based on a read master chiplet global counter value, (iv) transmit that global counter synchronization value to one or more slave chiplets, and (v) to broadcast a global counter synchronization pulse trigger to cause any unsynchronized slave chiplets to latch the global counter synchronization value into a locally-stored global counter subsystem within each slave chiplet.

In some embodiments, the master chiplet and slave chiplet may be instantiated with system power management interface (SPMI) slave interfaces, or function blocks, to support chiplet-to-chiplet communications. A master chiplet may configure an SPMI slave interface or a CTI interface for transferring the global counter synchronization pulse trigger to any unsynchronized slave chiplets. Slave chiplets global counter synchronization requests and master chiplet synchronization responses may be transferred over the SPMI, or any other physical interface.

In some embodiments, multiple-chiplet global counter synchronization may be performed during a boot sequence using sleep clock edge-based global counter synchronization. For example, upon boot, a master chiplet may reset any connected slave chiplets to prepare the slave chiplets for synchronization, such that each of the chiplets at system boot is unsynchronized. In some embodiments, multiple-chiplet global counter synchronization may be performed, using sleep clock edge-based global counter synchronization, when a slave chiplet global counter is halted. For example, an individual slave chiplet may be halted, and therefore unsynchronized with the master chiplet, while other slave chiplets may still be synchronized with the master chiplet. The unsynchronized slave chiplet may disable the halt trigger and request global counter synchronization with the master chiplet while the other chiplets remain unaffected. In some embodiments, multiple-chiplet global counter synchronization may be performed, using sleep clock edge-based global counter synchronization, when a master chiplet global counter is halted.

FIG. 1 is a component block diagram illustrating an example multiple-chiplet system circuitry 100 suitable for implementing any of the various embodiments. Any number of chiplets greater than or equal to two chiplets may be used to implement various embodiments. The illustrated example multiple-chiplet system 100 includes four chiplets 110a, 110b, 110c, and 110d located within a single system package, or system-in-a-package (SIP) 104, and a PMIC controller 102. The multiple-chiplet system 100 may further include an interface bus 106 (e.g., SPMI, inter-integrated circuit ($I^2C$) bus). As another example, six chiplets may be implemented within the SIP 104 with one operating as a first (i.e., primary/master) chiplet and the remaining five chiplets operating as second (i.e., secondary/subsidiary/slave) chiplets. In some embodiments, the PMIC controller 102 may be located within the SIP 104.

In various embodiments, one of the chiplets 110a, 110b, 110c, and 110d may be configured as a master chiplet, and the remaining chiplets may be configured as slave chiplets. For example, the chiplet 110a may be configured as a master chiplet, and the chiplets 110b, 110c, and 110d may be configured as slave chiplets. Unless otherwise specified, the following examples and embodiments are described using the non-limiting example of the chiplet 110a configured as the master chiplet, and the chiplets 110b, 110c, 110d configured as slave chiplets. The master chiplet 110a is illustrated as having additional components (e.g., SPMI master interface 112, master timer 114, multiplexors 131, 133) as compared to the slave chiplets 110b, 110c, 110d. However, since each of the chiplets 110a, 110b, 110c, 110d may be configured as a master chiplet, each of the chiplets 110b, 110c, 110d may also include the components illustrated within the master chiplet 110a.

For ease of description, operations of various embodiments may be described herein using the non-limiting example of a two-chiplet system including a first chiplet (e.g., 110a) configured or functioning as a primary/master and a second chiplet (e.g., 110b) configured or functioning as a secondary/subsidiary/slave chiplet. However, descriptions referring to a first chiplet and a second chiplet and not referencing further chiplets are not intended to be limiting as operations between two chiplets are representative of the operations between any number of chiplets.

In some embodiments, one or more of the chiplets 110a, 110b, 110c, and 110d may operate collectively as a central processing unit (CPU) of the multiple-chiplet system 100 that carries out the instructions of software application programs by performing the arithmetic, logical, control and input/output (I/O) operations specified by the instructions. In some embodiments, one or more of the chiplets 110a, 110b, 110c, and 110d may operate as a specialized processing unit. Each chiplet 110a, 110b, 110c, and 110d may include one or more cores, and each core may perform operations independent of the other cores within the same chiplet and cores within other chiplets. In addition, any or all of the chiplets 110a, 110b, 110c, and 110d may be included as part of a processor cluster architecture, such as a synchronous processor cluster architecture, an asynchronous or heterogeneous processor cluster architecture, and the like.

The chiplets 110a, 110b, 110c, and 110d may include various additional system components, resources, and custom circuitry for managing sensor data, analog-to-digital conversions, wireless data transmissions, and for performing other specialized operations, such as decoding data packets and processing encoded audio and video signals for rendering in a web browser. For example, the system components and resources of the chiplets 110a, 110b, 110c, and 110d may include power amplifiers, voltage regulators, oscillators, phase-locked loops, peripheral bridges, data controllers, memory controllers, system controllers, access ports, timers, and other similar components used to support the processors and software clients running within the SIP 104 and outside but in electrical communication with the SIP (e.g., PMIC controller 102) within the multiple-chiplet system 100. The system components and resources and/or custom circuitry may also include circuitry to interface with peripheral devices, such as cameras, electronic displays, wireless communication devices, external memory chips, etc. The chiplets 110a, 110b, 110c, and 110d may each further include input/output modules for communicating with resources external to the SIP, such as a clock source or the PMIC controller 102. Resources external to the SIP may be shared by two or more of the chiplets 110a, 110b, 110c, and 110d.

The chiplets 110a, 110b, 110c, and 110d may include memory devices 122a, 122b, 122c, and 122d (labeled as "Memory") that may be a volatile or non-volatile memory configured for storing data and processor-executable code for access by one or more processing cores 120a, 120b, 120c, and 120d (labeled as "Proc") of each respective chiplet 110a, 110b, 110c, and 110d. In addition to the memory devices 122a, 122b, 122c, and 122d, the multiple-chiplet system 100 may include one or more additional memory devices (not shown) located internally or externally to the SIP 104 that may be configured for various purposes. One or more memory devices including the memory devices 122a, 122b, 122c, and 122d may include volatile memories such as random-access memory (RAM) or main memory, or cache memory. These memory devices may be configured to temporarily hold a limited amount of data received from a data sensor or subsystem, data, and/or processor-executable code instructions that are requested from non-volatile memory, loaded to the memory devices from non-volatile memory in anticipation of future access based on a variety of factors, and/or intermediary processing data and/or processor-executable code instructions produced by the chiplets 110a, 110b, 110c, and 110d and temporarily stored for future quick access without being stored in non-volatile memory. The memory devices 122a, 122b, 122c, and 122d of the multiple-chiplet system 100 may be configured to store data and processor-executable code, at least temporarily, that is loaded to the memory devices 122a, 122b, 122c, and 122d in each chiplet 110a, 110b, 110c, and 110d for access by one or more of the processing cores 120a, 120b, 120c, and 120d of the chiplets 110a, 110b, 110c, and 110d. The data or processor-executable code loaded to the memory devices 122a, 122b, 122c, and 122d in each chiplet 110a, 110b, 110c, and 110d may be loaded in response to execution of a function by the processing cores 120a, 120b, 120c, and 120d.

In some embodiments, the processing cores 120a, 120b, 120c, and 120d may perform operations related to various subsystems and/or function blocks created as virtual spaces within the chiplets 110a, 110b, 110c, 110d. For example, the processing cores 120a, 120b, 120c, and 120d may perform operations related to timer subsystems 124a, 124b, 124c, 124d, global counter subsystems 126a, 126b, 126c, 126d, and SPMI slave function blocks 130a, 130b, 130c, 130d.

The chiplets 110a, 110b, 110c, 110d may include timer subsystems 124a, 124b, 124c, 124d (labeled as timer SS) respectively. The timer subsystems 124a, 124b, 124c, 124d may be used to regulate, control, and retain a local global counter for clock synchronization between the chiplets 110a, 110b, 110c, 110d. In some embodiments, the global counter may be a 56-bit global counter value. The timer subsystems 124a, 124b, 124c, 124d may include global counter subsystems 126a, 126b, 126c, 126d (labeled as GC SS) that may be loaded with global counter values for clock synchronization between the chiplets 110a, 110b, 110c, 110d. In some embodiments, the global counter may also be referred to as a system counter.

The PMIC controller 102 may control, distribute, or otherwise regulate clock signals used to synchronize the chiplets 110a, 110b, 110c, and 110d. The chiplets 110a, 110b, 110c, 110d may receive various clock signals from the PMIC controller 102. For example, the PMIC controller 102 may store or otherwise receive from external components (e.g., crystal oscillator) reference clock signals for the chiplets 110a, 110b, 110c, and 110d to use for synchronization purposes. The reference clock signals may include clock signals corresponding to an active mode, a sleep mode, or any other predefined mode having a preset frequency. For example, the PMIC controller 102 may transmit a 19.2 MHz clock corresponding to an active mode to the chiplets 110a, 110b, 110c, and 110d. Additionally, the PMIC controller 102 may transmit a 32 kHz clock, or a sleep clock 108, corresponding to a sleep mode/low power mode to the chiplets 110a, 110b, 110c, and 110d. Other clock frequencies may be utilized. The sleep clock 108 is always available to the chiplets 110a, 110b, 110b, 110d.

In various implementations, a crystal oscillator (CXO) (not shown) may generate an active clock signal (e.g., 19.2 MHz) that is distributed from the common clock source PMIC controller 102. The sleep clock 108 (e.g., 32 kHz) may be derived from the CXO active clock and may always be available to each of the chiplets 110a, 110b, 110c, 110d. For example, the sleep clock 108 may be distributed from the PMIC controller 102 to timer subsystems 124a, 124b, 124c, 124d for synchronization purposes. A global counter of the multiple-chiplet system 100 may be incremented by 1 when the CXO active clock is available, and may increment by 586 when the clock source is switched to the sleep clock 108. The sleep clock 108 and CXO active clock may have any integer or non-integer relationship as long as the clocks are sourced from the same crystal.

In some embodiments, the sleep clock 108 skew between chiplets 110a, 110b, 110c, 110d, may be less than one CXO clock period (e.g., 52.08 ns for a 32 kHz sleep clock). In some embodiments, the skew may be less than or equal to two CXO clock periods. The sleep clock 108 may be supplied by the PMIC to the chiplets 110a, 110b, 110c, 110d, and may enter at a ball grid array (BGA) pin of the package (e.g., SIP 104) and then distributed to all chiplets 110a, 110b, 110c, 110d in the package (e.g., SIP 104). The sleep clock 108 routing may be connected in a star configuration between the chiplets 110a, 110b, 110c, 110d. In some embodiments, the sleep clock 108 insertion delay inside each chiplet 110a, 110b, 110c, 110d may be balanced to keep process-to-process variation less than 52 nanoseconds (ns).

The interface bus 106 may be a broadcast interface in which data communication messages may be broadcast to multiple hardware components simultaneously. For example, the interface bus 106 may be an SPMI bus that may allow the PMIC controller 102 and the chiplets 110a, 110b, 110c, 110d to communicate through "telegrammed" or broadcast messaging techniques. For example, the PMIC controller 102 may broadcast a clock synchronization message across the interface bus 106 to cause the chiplets 110a, 110b, 110c, 110d to perform clock synchronization actions simultaneously or nearly simultaneously (i.e., limited by hardware communication path delay). As another example, the master chiplet 110a may include an SPMI master interface 112 to broadcast clock synchronization messages to the PMIC controller 102 and the chiplets 110b, 110c, 110d. By implementing an interface bus 106 that is an SPMI bus or other type of broadcasting communication interface, the master chiplet 110a may synchronize the slave chiplets 110b, 110c, 110d simultaneously in parallel. In some embodiments, the master chiplet 110a may synchronize the slave chiplets 110b, 110c, 110d individually. In some embodiments, the master chiplet 110a may synchronize the slave chiplets 110b, 110c, 110d sequentially, if configured when implementing a broadcasting interface such as an SPMI, or if limited by an interface bus 106 that is a serial interface and not a parallel broadcasting interface. Slave chiplets 110b, 110c, 110d synchronization requests and master chiplet 110a synchronization responses including a global counter 56-bit value may be transferred over the interface bus 106 (e.g., SPMI) or any other physical interface.

The chiplets 110a, 110b, 110c, 110d may each be instantiated with SPMI slave function blocks 130a, 130b, 130c, 130d respectively. The SPMI slave function blocks 130a, 130b, 130c, 130d may support circuit-to-circuit (C2C) communications at the early stage of preboot loading. Master chiplet 110a software (i.e., primary bootloader (PBL)/secondary bootloader (SBL)) may configure the SPMI slave function blocks 130a, 130b, 130c, 130d for transferring a synchronization signal, pulse, or trigger. The synchronization trigger may be transferred to each SPMI slave function block 130a, 130b, 130c, 130d within a sleep clock period (e.g., 30.5 µs (1/32 kHz)) to ensure the correct synchronization clock edge is identified and used. The timer subsystem 124a of the master chiplet 110a may include a master timer 114. The master timer 114 may initiate a synchronization pulse trigger that may be relayed by the SPMI slave function block 130a to the SPMI slave function blocks 130b, 130c, 130d.

The one or more processing cores 120a, 120b, 120c, 120d may include general purpose input/output (GPIO) pins or an internally hardwired communication interface that may be used to receive and transmit data messages to and from the PMIC controller 102 and between other chiplet communication interfaces and/or GPIO pins. For example, a CTI 130 may include one or more data paths connecting GPIO pins of the chiplets 110a, 110b, 110c, 110d that may allow the chiplets 110a, 110b, 110c, 110d to transmit and receive data communications and/or synchronization messages between each of the chiplets 110a, 110b, 110c, 110d. The CTI 136 may be used to transmit CTI trigger signals to the master chiplet 110a to halt the master chiplet global counter stored within the master chiplet global counter subsystem 126a. The CTI 136 may be used to transmit CTI trigger signals to the slave chiplets 110b, 110c, 110d to halt the slave chiplets global counters stored within the global counter subsystems 126b, 126c, 126d respectively.

The master chiplet 110a software (i.e., primary bootloader (PBL)/secondary bootloader (SBL)) may configure the CTI 136 for transferring synchronization pulses. The synchronization pulse may be transferred to each timer subsystem 124a, 124b, 124c, 124d within a sleep clock period (e.g., 30.5 µs (1/32 kHz)) to ensure the correct synchronization clock edge is identified and used.

For example, the master chiplet 110a may activate a synchronization select signal (labeled as "sync sel") to toggle between synchronization methods. In some embodiments, the PMIC controller 102 may toggle the status of the synchronization select signal. Activating the synchronization select signal may allow the multiple-chiplet system 100 to switch from an SPMI-based broadcasting synchronization method implementing the interface bus 106 to a GPIO-based synchronization method implementing the CTI 136. In an SPMI-based broadcasting synchronization method, various synchronization requests and responses may be communicated between the master chiplet SPMI slave function block 130a and the slave chiplet SPMI slave function blocks 130b, 130c, 130d across the interface bus 106. The SPMI slave function blocks 130a, 130b, 130c, 130d may relay a global counter value received from the interface bus 106 (i.e., at system bootup or system resynchronization) through the respective multiplexors 134a, 134b, 134c, 134d to latch the global counter value into the respective global counter subsystems 126a, 126b, 126c, 126d. Activating the synchronization select signal may toggle the data paths of the multiplexors illustrated (e.g., multiplexors 131, 132a-d, 133, 134a-d). The master timer 114 may initiate a synchronization pulse trigger through the multiplexor 133 and the multiplexor 131 (i.e., as CTI trig out 0) onto the CTI 136 (i.e., through a number of GPIO pins). The synchronization pulse trigger from the master timer 114 may be further propagated and latched into each global counter subsystem 126a, 126b, 126c, 126d through multiplexors 132a, 132b, 132c, 132d (i.e., as CTI trig in 0) and then multiplexors 134a, 134b, 134c, 134d respectively. When the global counter synchronization mode is not selected (i.e., synchronization select signal ("sync sel") is 0 or low), multiplexors 134a, 134b, 134c, 134d may output CTI trig0 for debugging purposes.

Figure 2:
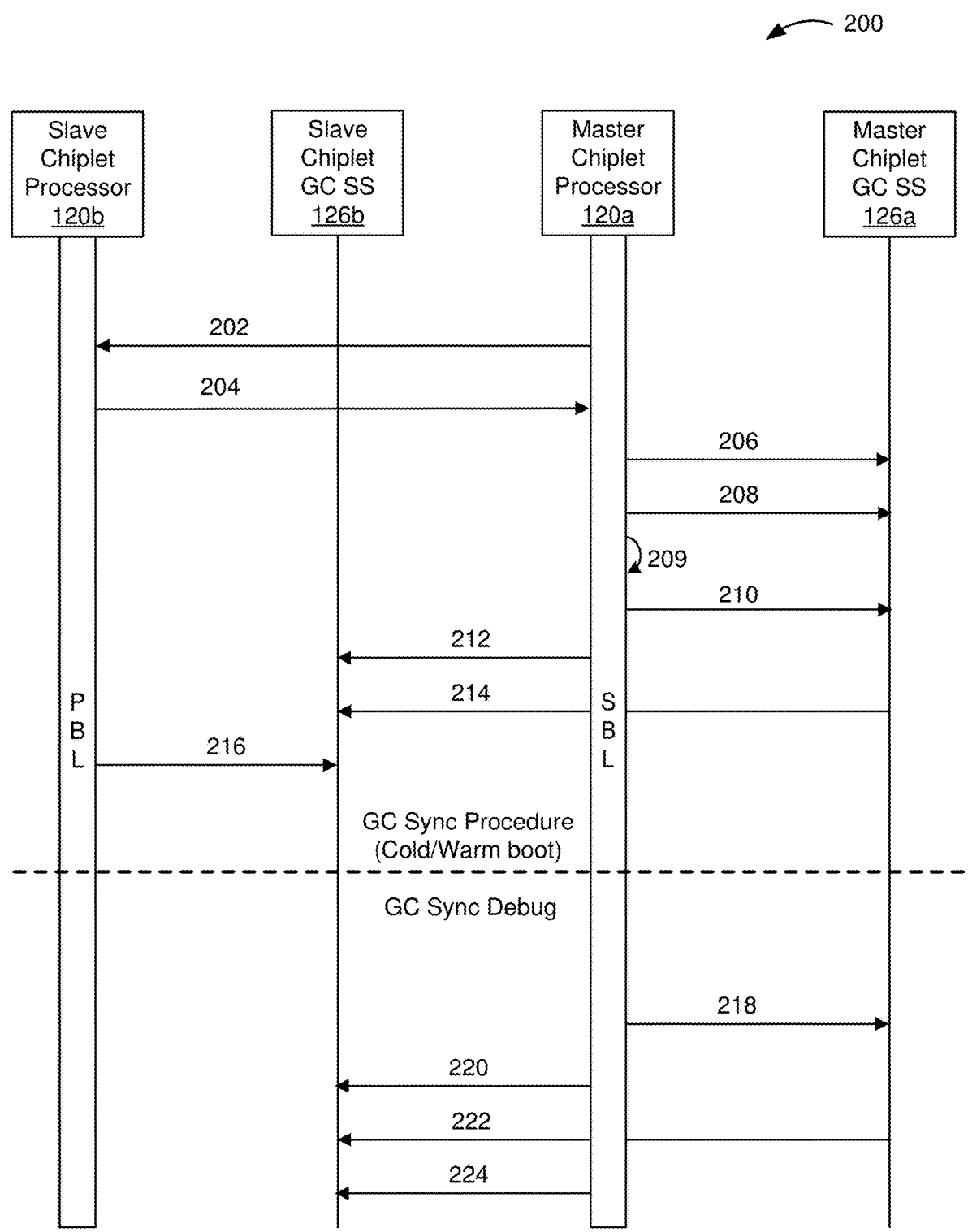
FIG. 2 is message flow diagram illustrating operations and chiplet-to-chiplet communications in a multiple-chiplet system for sleep clock edge-based global counter synchronization in a multiple-chiplet system during a boot sequence according to some embodiments.
Figure 3:
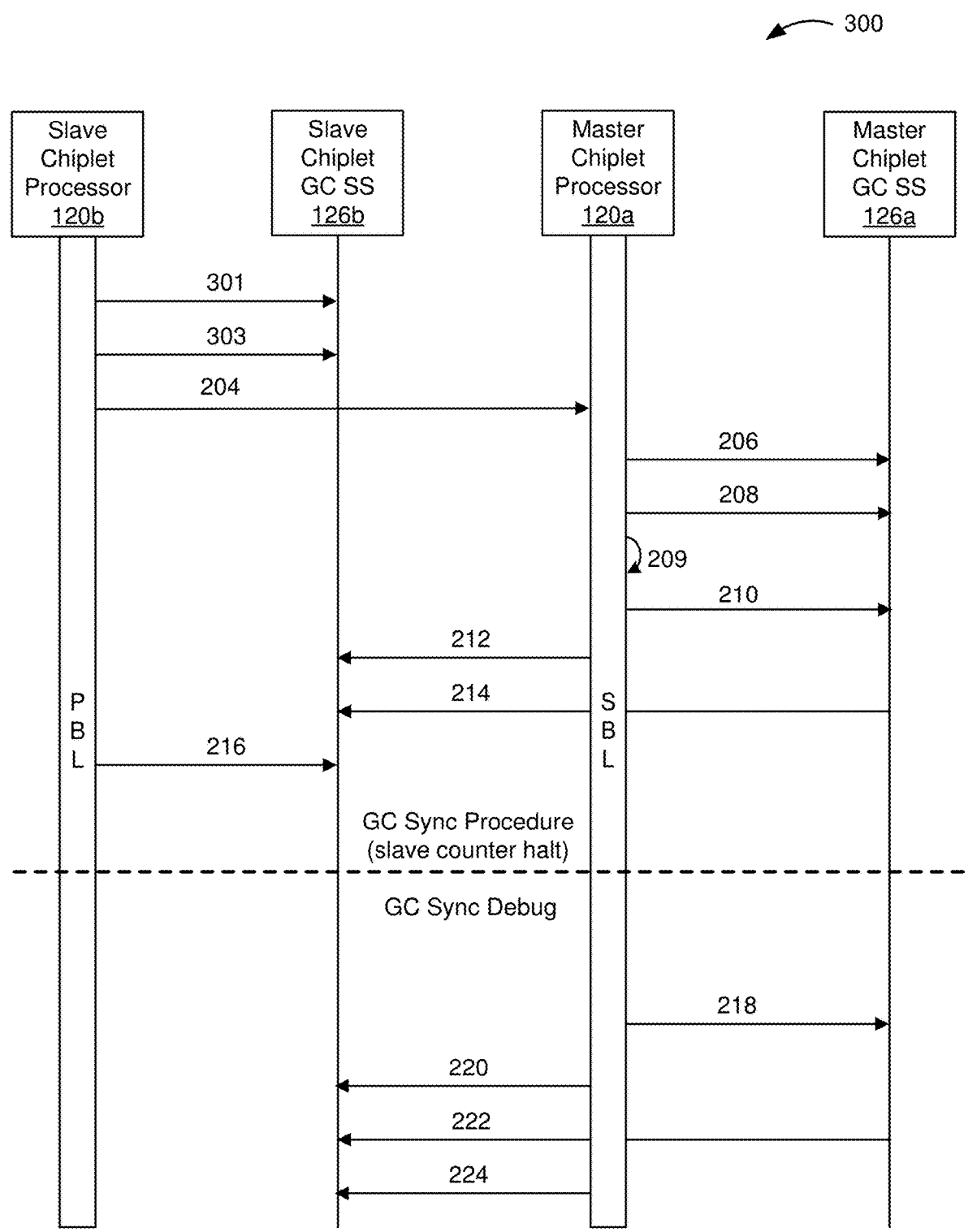
FIG. 3 is message flow diagram illustrating operations and chiplet-to-chiplet communications in a multiple-chiplet system for sleep clock edge-based global counter synchronization in a multiple-chiplet system when a slave chiplet global counter is halted according to some embodiments.
Figure 4:
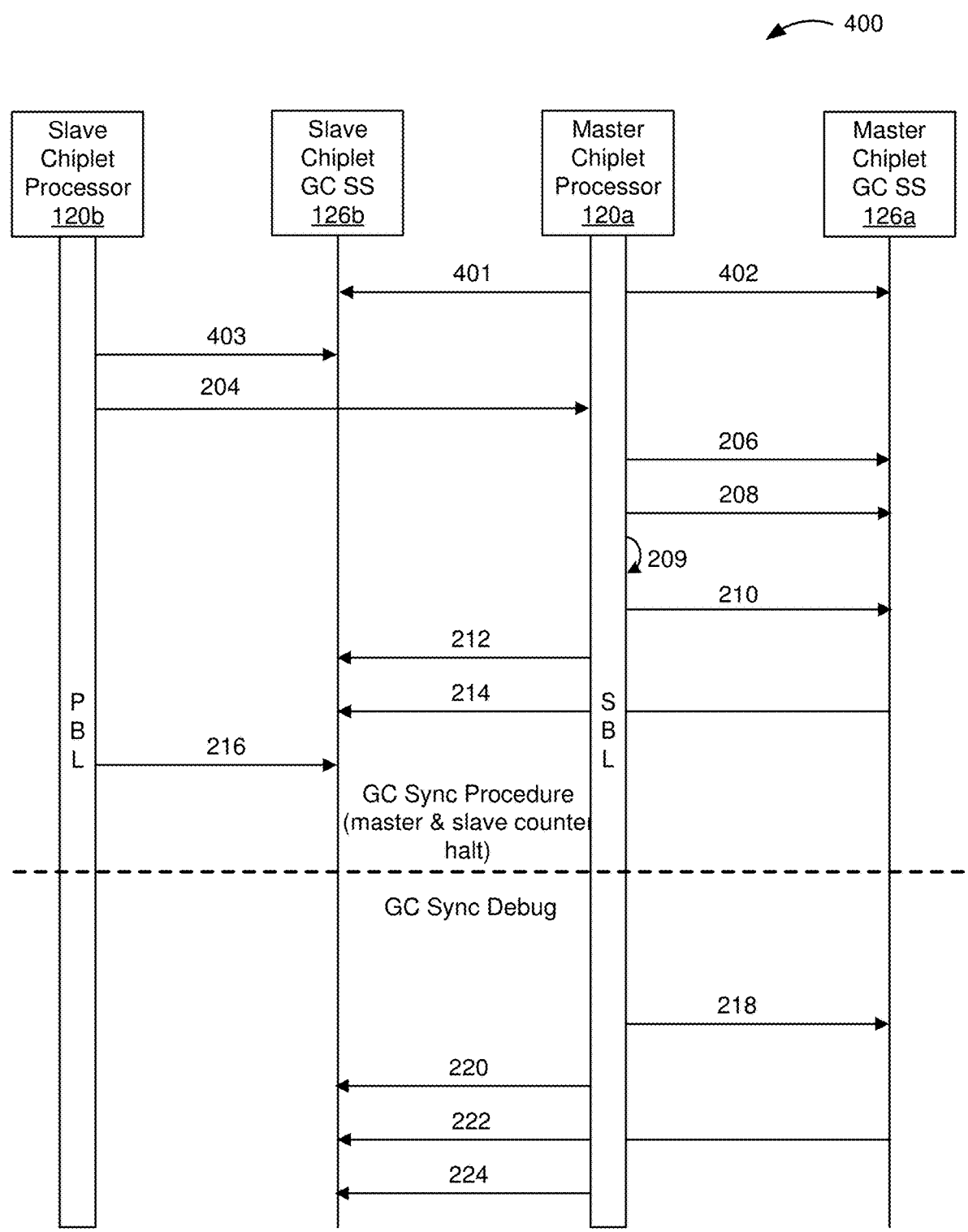
FIG. 4 is message flow diagram illustrating operations and chiplet-to-chiplet communications in a multiple-chiplet system for sleep clock edge-based global counter synchronization in a multiple-chiplet system when a master chiplet global counter is halted according to some embodiments.

FIGS. 2-4 are message flow diagrams 200, 300, and 400 illustrating operations and chiplet-to-chiplet and intra-chiplet communications for sleep clock edge-based global counter synchronization in a multiple-chiplet system according to some embodiments. The operations and communications for sleep clock edge-based global counter synchronization in a multiple-chiplet system illustrated in FIGS. 2-4 may be implemented using at least two chiplets (e.g., chiplets 110a, 110b, 110c, 110d) and a PMIC (e.g., PMIC controller 102) communicably connected via an interface bus (e.g., interface bus 106). Some of the operations or communications illustrated in FIGS. 2-4 may not be performed in all embodiments, and operations and communications may be performed in a different order than the examples shown in FIGS. 2-4.

With reference to FIGS. 1-4, a master chiplet 110a having a master chiplet processor 120a and a master chiplet global counter subsystem 126a may communicate with a slave chiplet 110b having a slave chiplet processor 120b and a slave chiplet global counter subsystem 126b. The master chiplet processor 120a may communicate locally with the master chiplet global counter subsystem 126a within the master chiplet 110a. The slave chiplet processor 120b may communicate locally with the slave chiplet global counter subsystem 126b within the slave chiplet 110b. The master chiplet processor 120a and the master chiplet global counter subsystem 126a may communicate with the slave chiplet processor 120b and the slave chiplet global counter subsystem 126b via the interface bus 106, which may be an SPMI bus. The interface bus 106 may be used to transmit and receive various global counter synchronization messages between the master chiplet processor 120a, the master chiplet global counter subsystem 126a, the slave chiplet processor 120b, and the slave chiplet global counter subsystem 126b for synchronizing a global counter based on an edge of the sleep clock 108.

FIGS. 2-4 illustrate various scenarios for resynchronization of the global counter within any of the chiplets 110a, 110b, 110c, 110d. For ease of illustration, operations of and communications between two chiplets (e.g., chiplets 110a, 110b) is shown. However, the same operations performed by or in conjunction with slave chiplet 110b may be simultaneously performed by or in conjunction with additional chiplets that are in electrical communication (e.g., 110c, 110d) with the master chiplet 110a. For example, communication 214 may be transmitted from the master chiplet global counter subsystem 126a to the slave chiplet global counter subsystems 126b, 126c, 126d simultaneously. As another example, the communication 220 may be transmitted from the master chiplet processor 120a to slave chiplet global counter subsystems 126b, 126c, 126d simultaneously.

FIG. 2 is message flow diagram illustrating operations and chiplet-to-chiplet and intra-chiplet communications for sleep clock edge-based global counter synchronization in a multiple-chiplet system during a boot sequence according to some embodiments.

During a cold boot (i.e., system power on) or a warm boot (i.e., system reset through software), the master chiplet 110a may not be synchronized with the slave chiplet 110b. For example, the master chiplet 110a may reset prior to the slave chiplet 110b, and may then provide an instruction to the slave chiplet 110b to bring the slave chiplet 110b out of reset. The global counter retained by the master chiplet global counter subsystem 126a may be out of synchronization with the global counter of the slave chiplet global counter subsystem 126b because the global counter values of the master chiplet 110a and the slave chiplet 110b are enabled independently. The following flow provides for resynchronization of the global counters of the master chiplet 110a and the slave chiplet 110b.

Upon a cold boot or warm boot, the master chiplet 110a comes out of reset, and the master chiplet global counter subsystem 126a begins incrementing according to the clock provided by the PMIC controller 102 (e.g., 19.2 MHz active clock).

In communication 202, the master chiplet processor 120a may generate and transmit a reset assertion to the slave chiplet processor 120b. The reset assertion may be transmitted by the master chiplet processor 120a to the slave chiplet processor 120b across a dedicated channel, such as a set of dedicated GPIO pins. The reset assertion may instruct the slave chiplet 110b to come out of reset (i.e., enter a PBL phase). The master chiplet processor 120a may transmit the reset assertion to the slave chiplet processor 120b after the master chiplet processor has entered the SBL phase. An SBL phase is an operating phase in which processes executed by a chiplet processor (e.g., master chiplet processor 120a, slave chiplet processor 120b) are performed using dynamic random-access memory (DRAM) that may be physically separate from the chip or package including the chiplet processor (e.g., DRAM located outside of an SoC including the master chiplet processor 120a and the slave chiplet processor 120b). In some embodiments, the master chiplet processor 120a may transmit the reset assertion to the slave chiplet processor 120b when the master chiplet processor 120a is in a PBL phase and before entering an SBL phase. A PBL phase is an operating phase in which processes executed by a chiplet processor (e.g., master chiplet processor 120a, slave chiplet processor 120b) are performed using read only memory (ROM) that may be physically located in the chip or package including the chiplet processor (e.g., ROM located inside an SoC including the master chiplet processor 120a and the slave chiplet processor 120b). The slave chiplet processor 120b may receive the reset assertion from the master chiplet processor 120a after the master chiplet processor 120a has entered the PBL phase. The reset assertion received by the slave chiplet processor 120b from the master chiplet processor 120a may trigger the slave chiplet processor 120b to enter a PBL phase. At this point, the global counter within the slave chiplet global counter subsystem 126b is not synchronized with the global counter within the master chiplet global counter subsystem 126a.

In communication 204, the slave chiplet processor 120b may generate and transmit a global counter synchronization request to the master chiplet processor 120a. The slave chiplet processor 120b may transmit the global counter synchronization request to the master chiplet processor 120a after entering the PBL phase. In some embodiments, the global counter synchronization request may be transmitted as an SPMI telegram or broadcast across the interface bus 106.

In some embodiments, the master chiplet processor 120a may continuously poll the interface bus 106 for any SPMI telegrams or broadcasts transmitted by the slave chiplet processor 120b. In some embodiments, the communications 206 and/or 208 may be performed in response to the master chiplet processor 120a detecting SPMI telegrams or broadcasts from the slave chiplet processor 120b requesting a global counter synchronization procedure.

In communication 206, the master chiplet processor 120a may transmit a command or instruction to, or otherwise configure, the master chiplet global counter subsystem 126a to enable global counter periodic reading by the master chiplet global counter subsystem 126a. In some embodiments, the master chiplet processor 120a may set a bit or register within the master chiplet global counter subsystem 126a (or within a memory associated with the master chiplet global counter subsystem 126a) to enable global counter periodic reading by the master chiplet global counter subsystem 126a. Enabling a periodic reading of the local global counter within the master chiplet global counter subsystem 126a may allow the master chiplet global counter subsystem 126a to read its local global counter at every rising edge of the sleep clock 108 (e.g., 32 kHz).

In communication 208, the master chiplet processor 120a may transmit a command or instruction to, or otherwise configure, the master chiplet global counter subsystem 126a to read the latest global counter value stored within the master chiplet global counter subsystem 126a. In some embodiments, the master chiplet processor 120a may set a bit or register within the master chiplet global counter subsystem 126a (or within a memory associated with the master chiplet global counter subsystem 126a) to read the latest global counter value stored within the master chiplet global counter subsystem 126a. In response to receiving the command or instruction from the master chiplet processor 120a, the master chiplet global counter subsystem 126a may make the local global counter corresponding to the latest rising edge of the sleep clock 108 available to the master chiplet processor 120a (e.g., within a register space or memory accessible by the master chiplet processor 120a). Thus, the master chiplet processor 120a may read, or take a snapshot of, the latest local global counter as determined by the periodic global counter reading enabled in communication 206.

In operation 209, the master chiplet processor 120a may determine the next sleep clock synchronization edge that may be used for synchronization with the slave chiplet global counter subsystem 126b. In some embodiments, the next sleep clock synchronization edge that may be used for synchronization with the slave chiplet global counter subsystem 126b may be the first sleep clock rising edge of the master chiplet sleep clock that occurs after the slave chiplet 110b finishes the PBL phase and enters the SBL phase.

In communication 210, the master chiplet processor 120a may configure a time comparator (e.g., master timer 114) within the master chiplet global counter subsystem 126a. The time comparator may be configured in preparation for triggering a global counter synchronization pulse trigger at some future sleep clock rising edge as determined by the sleep clock synchronization edge determined in operation 209.

In communication 212, the master chiplet processor 120a may transmit a global counter synchronization value to the slave chiplet global counter subsystem 126b over the interface bus 106 (e.g., as an SPMI broadcast message). The slave chiplet global counter subsystem 126b may store the global counter synchronization value in a preload register in preparation for loading the global counter synchronization value onto the local global counter stored and utilized by the slave chiplet global counter subsystem 126b.

In communication 214, the master chiplet global counter subsystem 126a may transmit a global counter synchronization pulse trigger (i.e., a sync message) to the slave chiplet global counter subsystem 126b. The slave chiplet global counter subsystem 126b may then latch in the global counter synchronization value stored within the preload register in communication 212 to synchronize the local global counter within the slave chiplet global counter subsystem 126b with the local global counter within the master chiplet global counter subsystem 126a.

In communication 216, the slave chiplet processor 120b may poll the slave chiplet global counter subsystem 126b to determine whether the synchronization has been completed. For example, slave chiplet processor 120b may poll a sync status register of the slave chiplet global counter subsystem 126b to determine whether a bit or register has been changed to signify a status that the synchronization process has been completed.

Communications 218-224 may be used for global counter synchronization debugging.

In communication 218, the master chiplet processor 120a may configure a time comparator (e.g., master timer 114) within the master chiplet global counter subsystem 126a. The time comparator may be configured in preparation for triggering a global counter synchronization pulse trigger at some future sleep clock rising edge. The time comparator may be configured to trigger the global counter synchronization pulse trigger in a manner similar to communication 210 as described above.

In communication 220, the master chiplet processor 120a may transmit a message to or otherwise instruct (i.e., set a register value) the slave chiplet global counter subsystem 126b to disable the global counter synchronization path. Disabling a global counter synchronization path may include disabling the SPMI slave function block 130b such that it may no longer be able to transmit and receive SPMI broadcast messages across the interface bus 106. In some embodiments, disabling a global counter synchronization path may also halt the global counter of the slave chiplet 110b.

In communication 222, the master chiplet global counter subsystem 126a may transmit a global counter synchronization pulse trigger (i.e., a sync message) to the slave chiplet global counter subsystem 126b. The slave chiplet global counter subsystem 126b may then latch in the global counter synchronization value stored within the preload register in communication 212 to synchronize the local global counter within the slave chiplet global counter subsystem 126b with the local global counter within the master chiplet global counter subsystem 126a. Communication 222 may be performed in a manner similar to communication 214 as described above.

In communication 224, the master chiplet processor 120a may read a global counter synchronization value stored within the slave chiplet global counter subsystem 126b. The master chiplet processor 120a may compare the global synchronization value determined in communication 218 against the global synchronization value stored by the preload register of the slave chiplet global counter subsystem 126b to determine whether the values match. The master chiplet processor 120a may determine that the synchronization process in communication 216 has been completed successfully if the global synchronization value determined in communication 218 matches the sell global synchronization value stored by the preload register of the slave chiplet global counter subsystem 126b.

The operations and communications described with reference to FIG. 2 may also be utilized during a slave chiplet crash event. Any slave chiplet 110b, 110c, 110d may crash during SBL or normal operations. When a slave chiplet crashes, the slave chiplet global counter, which is enabled by PBL, stored by a slave chiplet global counter subsystem may become unsynchronized with the master chiplet global counter stored by the master chiplet global counter subsystem 126a. The master chiplet 110a may choose to reset any of the crashed slave chiplets 110b, 110c, 110d individually while not resynchronizing any slave chiplets 110b, 110c, 110d that have not crashed.

The operations and communications described with reference to FIG. 2 may also be utilized during a master chiplet crash event. The multiple-chiplet system 100 may operate to perform global counter synchronization as if the master chiplet 110a and the slave chiplets 110b, 110c, 110d were cold booted.

FIG. 3 is message flow diagram illustrating operations and chiplet-to-chiplet and intra-chiplet communications for sleep clock edge-based global counter synchronization in a multiple-chiplet system when a slave chiplet global counter is halted according to some embodiments.

A CTI trigger may halt a global counter stored locally by any of the slave chiplets 110b, 110c, 110d. The CTI trigger may be used to halt the locally stored (i.e., in the corresponding slave chiplet global counter subsystems 126b, 126c, 126d) for debugging purposes, such as determining a time stamp at a specific error event. When any locally-stored global counter of the slave chiplets 110b, 110c, 110d is halted by a CTI trigger, the global counter value may become unsynchronized with global counter of the master chiplet 110a stored locally within the master chiplet global counter subsystem 126a. The following flow provides for resynchronization of the global counters of the master chiplet 110a and the slave chiplet 110b after the slave chiplet global counter is halted.

In communication 301, slave chiplet processor 120b may transmit a message to or otherwise instruct (i.e., set a register value) the slave chiplet global counter subsystem 126b to disable the global counter halt, which may be referred to as a CTI trigger halt. Disabling the global counter halt may allow the global counter stored within the slave chiplet global counter subsystem 126b to begin counting again. However, because of the duration of the CTI halt, the slave chiplet global counter may have become unsynchronized with the master chiplet global counter.

In communication 303, the slave chiplet processor 120b may transmit a message to or otherwise instruct (i.e., set a register value) the slave chiplet global counter subsystem 126b to enable a global counter synchronization path. Enabling a global counter synchronization path may include initiating a SPMI slave function block 130b that may be able to transmit and receive SPMI broadcast messages across the interface bus 106.

Once the slave chiplet 110b is reconfigured to begin global counter synchronization and the locally-stored global counter is running, the operations and communications 204-216 may be performed as described with reference to FIG. 2 to synchronize the slave chiplet global counter stored within the slave chiplet global counter subsystem 126b with the master chiplet global counter stored within the master chiplet global counter subsystem 126a. Additionally, any debugging procedures may be performed according to communications 218-224 as described with reference to FIG. 2.

FIG. 4 is message flow diagram illustrating operations and chiplet-to-chiplet and intra-chiplet communications for sleep clock edge-based global counter synchronization in a multiple-chiplet system when a master chiplet global counter is halted according to some embodiments.

A CTI trigger may halt a global counter stored locally by the master chiplet 110a. The CTI trigger may be used to halt the locally stored (i.e., in the master chiplet global counter subsystem 126a) for debugging purposes, such as determining a time stamp at a specific error event. When the locally-stored global counter of the master chiplet 110a is halted by a CTI trigger, the global counter value may become unsynchronized with all of the global counters of the slave chiplets 110b, 110c, 110d stored locally within the slave chiplet global counter subsystems 126b, 126c, 126d. For example, when the master chiplet global counter is halted by a CTI trigger, the same CTI trigger is transferred to the slave chiplet global counters through the CTI network for halting slave chiplet global counters simultaneously. The master chiplet may transmit a CTI unhalt trigger (interrupt request).

Thus, the multiple-chiplet system may reinitialize the master chiplet 110a in addition to the slave chiplets 110b, 110c, 110d to resynchronize all of the locally-stored global counter values. The following flow provides for resynchronization of the global counters of the master chiplet 110a and the slave chiplet 110b after the master chiplet global counter is halted.

In communication 401, master chiplet processor 120a may transmit a message to or otherwise instruct (i.e., set a register value) the slave chiplet global counter subsystem 126b to disable the global counter halt, which may be referred to as a CTI trigger halt. Disabling the global counter halt may allow the global counter stored within the slave chiplet global counter subsystem 126b to begin counting again. However, because of the duration of the CTI halt, the slave chiplet global counter may have become unsynchronized with the master chiplet global counter.

In communication 402, master chiplet processor 120a may transmit a message to or otherwise instruct (i.e., set a register value) the master chiplet global counter subsystem 126a to disable the global counter halt, which may be referred to as a CTI trigger halt. Disabling the global counter halt may allow the global counter stored within the master chiplet global counter subsystem 126a to begin counting again. However, because of the duration of the CTI halt, the master chiplet global counter may have become unsynchronized with the slave chiplet global counter.

In some embodiments, communications 401 and 402 may be a single interrupt request transmitted from the master chiplet processor 120a. For example, the master chiplet CTI unhalt trigger may transmit an interrupt request to the master chiplet global counter subsystem 126a, which may be the same trigger transmitted to slave chiplet processor 120b through the CTI network as an interrupt request to the slave A53.

In communication 403, slave chiplet processor 120b may transmit a message to or otherwise instruct (i.e., set a register value) the slave chiplet global counter subsystem 126b to enable a global counter synchronization path. Enabling a global counter synchronization path may include initiating a SPMI slave function block 130b that may be able to transmit and receive SPMI broadcast messages across the interface bus 106.

Once the master chiplet 110a and the slave chiplet 110b are reconfigured to begin global counter synchronization and the locally-stored global counters are running, the operations and communications 204-216 may be performed as described with reference to FIG. 2 to synchronize the slave chiplet global counter stored within the slave chiplet global counter subsystem 126b with the master chiplet global counter stored within the master chiplet global counter subsystem 126a. Additionally, any debugging procedures may be performed according to communications 218-224 as described with reference to FIG. 2.

Figure 5:
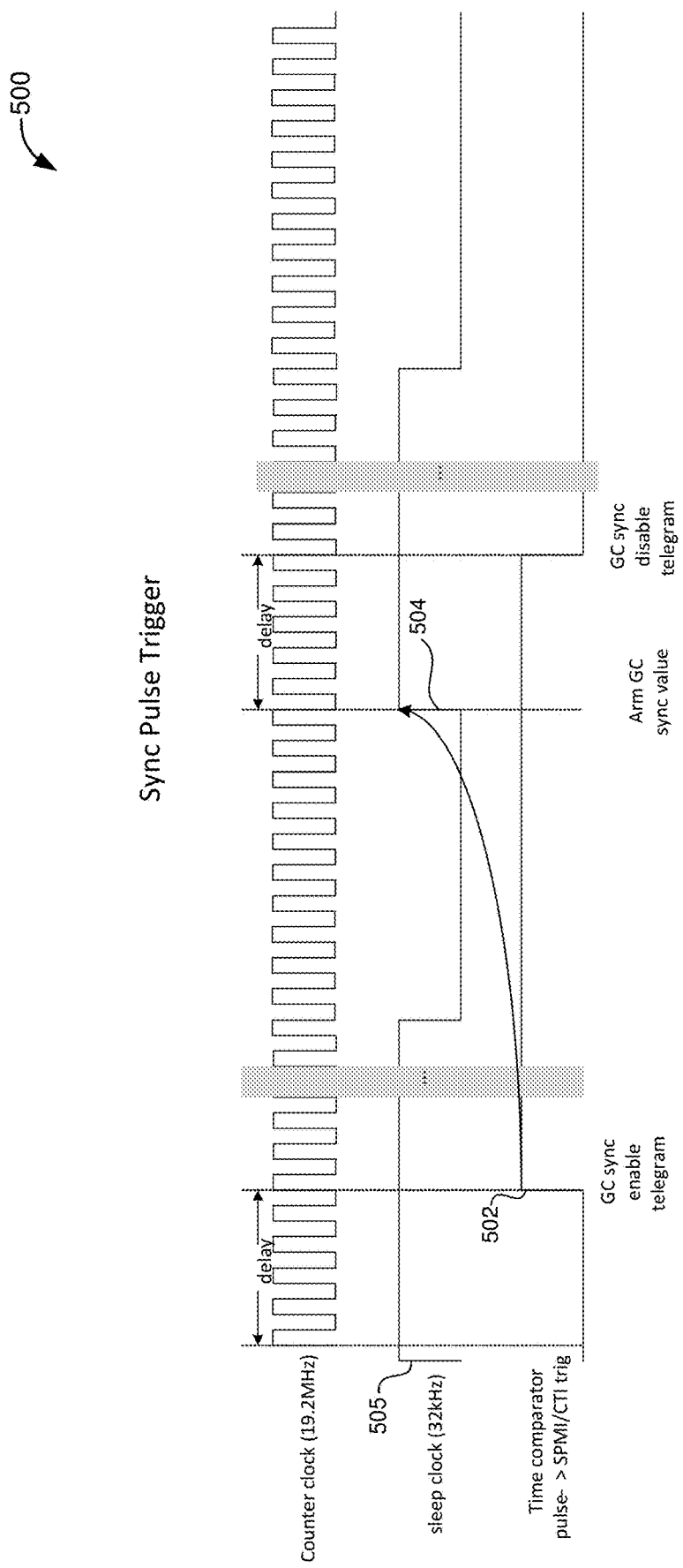
FIG. 5 is a timing diagram illustrating a timing flow for a global counter synchronization pulse trigger in a multiple-chiplet system according to some embodiments.

FIG. 5 is a timing diagram illustrating a timing flow 500 for a global counter synchronization pulse trigger in a multiple-chiplet system according to some embodiments. With reference to FIGS. 1-5, timing of some of the communications described with reference to FIGS. 2-4 are illustrated.

At event 502, a time comparator (e.g., master timer 114) of the master chiplet global counter subsystem 126a may initiate a global counter synchronization pulse trigger. If the interface bus 106 is capable of parallel communication, such as when the interface bus 106 is capable of being configured as an SPMI broadcast bus, the time comparator may trigger the global counter synchronization pulse trigger as a global counter synchronization enable telegram. If the interface bus 106 is not capable of parallel communication, the time comparator may trigger the global counter synchronization pulse trigger as a global counter synchronization enable message through a serial data path, such as dedicated GPIO pins between the master chiplet 110a and the slave chiplet 110b. The global counter synchronization pulse trigger may instruct the slave chiplet 110b to load a global counter synchronization value (e.g., stored within a preload register of the slave chiplet 110b; "N" as described with reference to FIG. 6 below) onto the slave chiplet global counter at the next rising edge of the sleep clock.

At event 504, the slave chiplet 110b may load a global counter synchronization value (e.g., stored within a preload register of the slave chiplet 110b; "N" as described with reference to FIG. 6 below) onto the slave chiplet global counter at the rising edge of the sleep clock (e.g., sleep clock synchronization edge "n" as described with reference to FIG. 6 below) in response to receiving the global counter synchronization pulse trigger. The global counter synchronization pulse trigger may be de-asserted by the time comparator after the slave chiplet 110b loads the global counter synchronization value into the slave chiplet global counter subsystem 126b. For example, in the case of an SPMI-enabled interface bus 106, the global counter synchronization pulse trigger, which may be a telegram or a broadcast message capable of being communicated to all slave chiplets 110b, 110c, 110d simultaneously, may be disabled after the rising edge identified at event 504 but before the following rising edge of the sleep clock.

In some embodiments in which the interface bus is not capable of parallel communication (e.g., dedicated GPIO pins of the master chiplet 110a are used to communicate with the slave chiplets 110b, 110c, 110d individually), a sleep clock rising edge 505 (e.g., sleep clock rising edge "n−1" as described with reference to FIG. 6 below) may be aligned with the global counter synchronization pulse trigger at 502. If the sleep clock rising edge 505 is synchronized with the global counter synchronization pulse trigger, the time comparator may transmit the global counter synchronization pulse trigger one sleep clock cycle ahead of the intended sleep clock cycle at event 504, therefore causing the slave chiplet global counter to be one sleep clock cycle ahead of the master chiplet global counter.

To avoid a premature global counter synchronization pulse trigger caused by the synchronization between the sleep clock and the global counter synchronization pulse trigger, the master chiplet 110a may introduce a delay after the sleep clock rising edge 505 to ensure the global counter synchronization pulse trigger follows the sleep clock rising edge 505. The delay may be a number of CXO cycles from the sleep clock rising edge 505.

Figure 6:
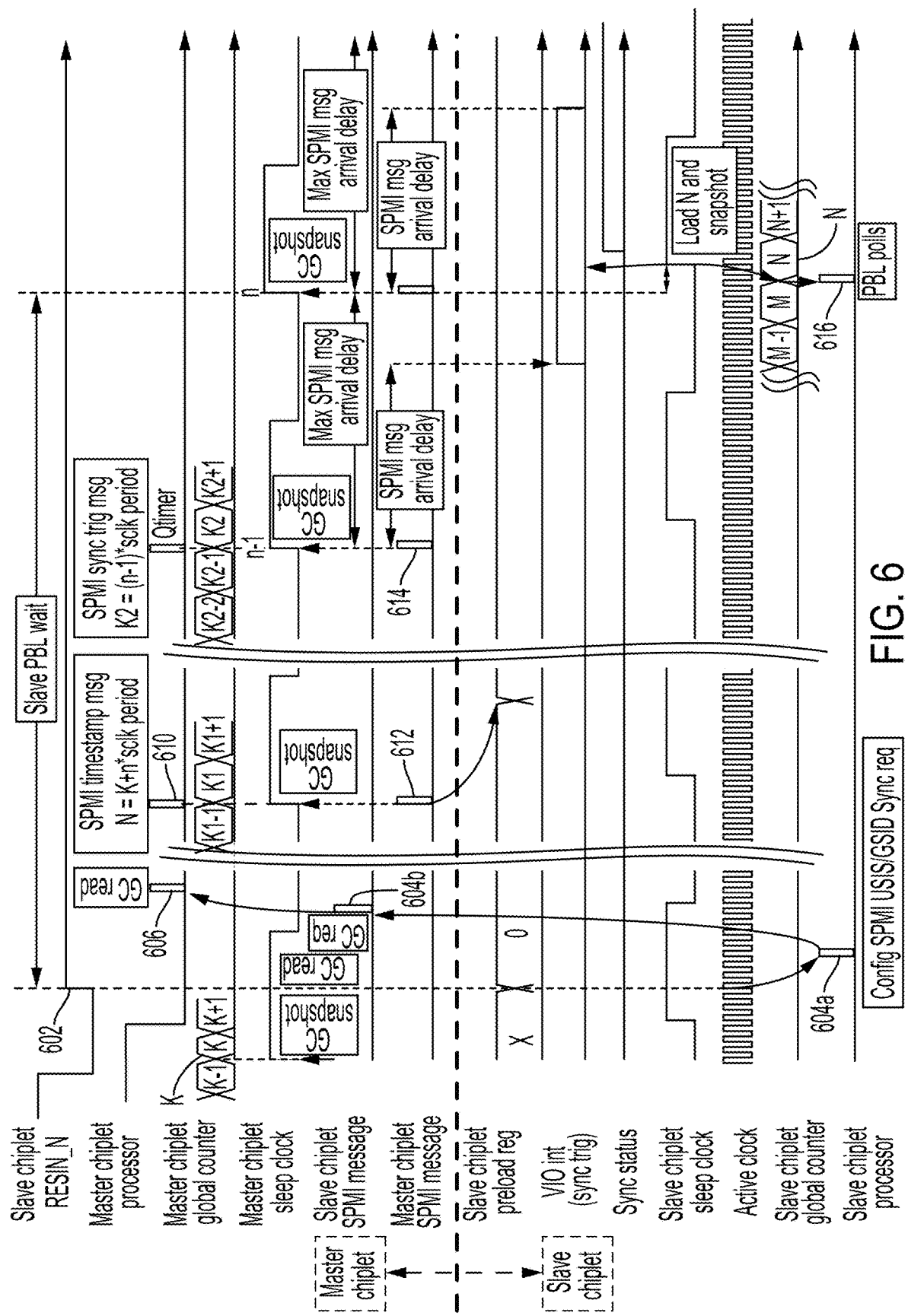
FIG. 6 is a timing diagram illustrating a timing flow for sleep clock edge-based global counter synchronization in a multiple-chiplet system according to some embodiments.

FIG. 6 is a timing diagram illustrating a timing flow 600 for sleep clock edge-based global counter synchronization in a multiple-chiplet according to some embodiments. With reference to FIGS. 1-6, various signals within the timing diagram are illustrated, including signals observed from the perspective of the master chiplet 110a, such as slave chiplet RESIN_N (i.e., a reset assertion provided by the PMIC controller 102 to the master chiplet 110a and redistributed from the master chiplet 110a to the slave chiplet 110b across a set of dedicated GPIO pins), master chiplet processor operations, master chiplet global counter (i.e., as stored within the master chiplet global counter subsystem 126a), master chiplet sleep clock (e.g., 32 kHz), slave chiplet SPMI message (i.e., messages observed by the master chiplet 110a over the interface bus 106), and master chiplet SPMI message (i.e., messages broadcast by the master chiplet 110a over the interface bus 106). Additional signals from the perspective of the slave chiplet 110b are illustrated, such as slave chiplet preload register, VIO int (i.e., global synchronization pulse trigger), synchronization status, slave chiplet sleep clock (e.g., 32 kHz), active clock (e.g., 19.2 MHz), slave chiplet global counter (i.e., as stored within the slave chiplet global counter subsystem 126b), and slave chiplet processor operations.

At event 602, the slave chiplet processor 120b may come out of reset in response to receiving a reset assertion from the master chiplet processor 120a. The master chiplet processor 120a may generate and transmit a reset assertion to the slave chiplet processor 120b. The master chiplet processor 120a may transmit the reset assertion to the slave chiplet processor 120b after the master chiplet processor has entered the PBL phase. The slave chiplet processor 120b may receive the reset assertion from the master chiplet processor 120a after the master chiplet processor 120a has entered the PBL phase. In some embodiments, the master chiplet processor 120a may transmit the reset assertion to the slave chiplet processor 120b after the master chiplet processor has entered the SBL phase. The reset assertion (e.g., RESIN_N) may be transmitted by the master chiplet processor 120a to the slave chiplet processor 120b across a dedicated channel, such as a set of dedicated GPIO pins. The reset assertion received by the slave chiplet processor 120b from the master chiplet processor 120a may trigger the slave chiplet processor 120b to enter a PBL phase. At this point, the global counter within the slave chiplet global counter subsystem 126b is not synchronized with the global counter within the master chiplet global counter subsystem 126a. The slave chiplet 110b may remain within the PBL phase at least until a sleep clock rising edge of the master chiplet sleep clock (e.g., designated as "n") has occurred, after which the slave chiplet global counter subsystem 126b may be synchronized with the master chiplet global counter subsystem 126a. The event 602 may be performed in a similar manner as the communication 202 as described with reference to FIG. 2.

At event 604a, the slave chiplet processor 120b may generate and transmit a global counter synchronization request to the master chiplet processor 120a. The slave chiplet processor 120b may transmit the global counter synchronization request to the master chiplet processor 120a after entering the PBL phase. In some embodiments, the global counter synchronization request may be transmitted as an SPMI telegram or broadcast across the interface bus 106. The global counter synchronization request generated or otherwise configured by the slave chiplet processor 120b may include a Unique Slave Identifier (USID) and/or a Group Slave Identifier (GSID).

At event 604b, the master chiplet processor 120a may detect or otherwise receive the global counter synchronization request transmitted by the slave chiplet processor 120b during the event 604a. In some embodiments, the master chiplet processor 120a may continuously poll the interface bus 106 for any SPMI telegrams or broadcasts transmitted by the slave chiplet processor 120b. The events 604a and 604b may be performed in a similar manner as the communication 204 as described with reference to FIG. 2.

In some embodiments, the events 606 may be performed in response to the master chiplet processor 120a detecting an SPMI telegram or broadcast from the slave chiplet processor 120b requesting a global counter synchronization procedure.

At event 606, the master chiplet processor 120a may transmit a command or instruction to, or otherwise configure, the master chiplet global counter subsystem 126a to enable global counter periodic reading by the master chiplet global counter subsystem 126a. In some embodiments, the master chiplet processor 120a may set a bit or register within the master chiplet global counter subsystem 126a (or within a memory associated with the master chiplet global counter subsystem 126a) to enable global counter periodic reading by the master chiplet global counter subsystem 126a. Enabling a periodic reading of the local global counter within the master chiplet global counter subsystem 126a may allow the master chiplet global counter subsystem 126a to read its local global counter at every rising edge of the master chiplet sleep clock (e.g., 32 kHz).

The master chiplet processor 120a may further transmit a command or instruction to, or otherwise configure, the master chiplet global counter subsystem 126a to read the latest global counter value stored within the master chiplet global counter subsystem 126a. In some embodiments, the master chiplet processor 120a may set a bit or register within the master chiplet global counter subsystem 126a (or within a memory associated with the master chiplet global counter subsystem 126a) to read the latest global counter value stored within the master chiplet global counter subsystem 126a. In response to receiving the command or instruction from the master chiplet processor 120a, the master chiplet global counter subsystem 126a may make the local global counter corresponding to the latest rising edge of the sleep clock 108 master chiplet processor 120a available to the master chiplet processor 120a (e.g., within a register space or memory accessible by the master chiplet processor 120a). Thus, the master chiplet processor 120a may read, or take a snapshot of, the latest local global counter as determined by the periodic global counter reading enabled at event 606. The event 606 may be performed in a similar manner as the communications 206 and 208 as described with reference to FIG. 2.

At event 610, the master chiplet processor 120a may determine the next sleep clock synchronization edge that may be used for synchronization with the slave chiplet global counter subsystem 126b. In some embodiments, the next sleep clock synchronization edge (e.g., master chiplet sleep clock rising edge "n") that may be used for synchronization with the slave chiplet global counter subsystem 126b may be the first sleep clock rising edge of the master chiplet sleep clock that occurs after the slave chiplet 110b finishes the PBL phase and enters the SBL phase (i.e., after the expiration of the slave PBL wait time).

The master chiplet processor 120a may configure a time comparator (e.g., master timer 114) within the master chiplet global counter subsystem 126a. The time comparator may be configured in preparation for triggering a synchronization pulse trigger at master chiplet sleep clock rising edge "n-1." The time comparator may be configured with the master chiplet sleep clock, such that the time comparator may track the times at which the master chiplet sleep clock exhibits a rising edge (e.g., at each global counter read/snapshot).

In some embodiments, the sleep clock synchronization edge may be determined by the duration of the overall global counter synchronization mechanism. The duration of the overall global counter synchronization mechanism may be a duration determined in software (e.g., via the master chiplet 110a and/or the PMIC controller 102), based at least on interface bus 106 latencies between master chiplet 110a and slave chiplet 110b, 110c, 110d (e.g., 8B global counter value and 2B sync message), and master chiplet 110a software latencies for (i) reading the current global counter value and transmitting it over the interface bus 106, and (ii) configuring the time comparator (e.g., master timer 114) for the global counter synchronization pulse trigger over the interface bus 106 (e.g., SPMI or CTI).

The master chiplet processor 120a may configure and/or generate, then transmit across the interface bus 106, a SPMI time stamp message including a global counter synchronization value. The master chiplet processor may determine or otherwise generate the global counter synchronization value "N" based on last-read, or latest, master chiplet global counter value "K." The global counter synchronization value, "N," may be equal to the last-read master chiplet global counter "K" plus the next sleep clock synchronization edge "n" times the master chiplet sleep clock period. For example, N=K+(n*(1/32 kHz)). The event 610 may be performed in a similar manner as the communications 209, 210, and 218 as described with reference to FIG. 2.

At event 612, the master chiplet processor 120a may transmit or broadcast a global counter synchronization value "N" to the slave chiplet global counter subsystem 126b over the interface bus 106 as a master chiplet SPMI message. The slave chiplet global counter subsystem 126b may store the global counter synchronization value "N" in a preload register in preparation for loading the global counter synchronization value onto the local global counter stored and utilized by the slave chiplet global counter subsystem 126b. With the global counter synchronization value "N" preloaded into the slave chiplet global counter subsystem 126b, the slave chiplet global counter subsystem 126b may be waiting to be synchronized with the master chiplet global counter subsystem 126a. The event 612 may be performed in a similar manner as the communication 212 as described with reference to FIG. 2.

At event 614, the master chiplet global counter subsystem 126a may transmit or broadcast a global counter synchronization pulse trigger (i.e., an SPMI sync trigger message) to the slave chiplet global counter subsystem 126b. The global counter synchronization pulse trigger may be broadcast to the slave chiplet global counter subsystem 126b over the interface bus 106 as a master chiplet SPMI message. The master chiplet processor 120a may broadcast the global counter synchronization pulse trigger at a time that is one master chiplet sleep clock cycle (i.e., n-1) that is before the sleep clock synchronization edge "n" that was determined during event 610 to be used for synchronization with the slave chiplet global counter subsystem 126b.

The master chiplet processor 120a may broadcast the global counter synchronization pulse trigger at a timer value that is equal to a master chiplet global counter value, or configured timer value, K2. In some embodiments, the global counter synchronization pulse trigger may be initiated by the time comparator (e.g., master timer 114). Previously, in event 610, the time comparator may have been configured with the master chiplet sleep clock, such that the time comparator may track the times at which the master chiplet sleep clock exhibits a rising edge (e.g., at each global counter read/snapshot). The master chiplet processor 120a, using the time comparator, may read or take a snapshot of the master chiplet global counter value at the rising edge "n-1" of the master chiplet sleep clock. When the time comparator value recorded at the master chiplet sleep clock rising edge "n-1" matches the configured value K2, the master chiplet processor 120a may broadcast the global counter synchronization pulse trigger. The master chiplet global counter value may be equal to (n-1) times the sleep clock period (e.g., K2=(n-1)(1/32 kHz).

The global counter synchronization pulse trigger may arrive at the slave chiplet global counter subsystem 126b before the next rising edge, "n," of the master chiplet sleep clock. The time between the rising edge "n-1" and the sleep clock synchronization edge "n" may be 586 crystal oscillator (XO) clocks, which may be referred to as the maximum SPMI message arrival delay, or the time during which the global counter synchronization pulse trigger must reach the slave chiplet global counter subsystem 126b. The time between the rising edge "n-1" when the global counter synchronization pulse trigger is broadcast and the time upon which the global counter synchronization pulse trigger is received by the slave chiplet global counter subsystem 126b (i.e., rising edge of VIO int (sync trig)) may be referred to as the SPMI message arrival delay. The SPMI message arrival delay may be time delay restricted by hardware communication paths. The SPMI message arrival delay may be less than the maximum SPMI message arrival delay.

After the slave chiplet global counter subsystem 126b receives the global counter synchronization pulse trigger as indicated by the rising edge of VIO int (sync trig), the slave chiplet global counter subsystem 126b may be ready to be synchronized with the master chiplet global counter subsystem 126a at the sleep clock synchronization edge "n." At the sleep clock synchronization edge "n," the global counter synchronization value "N" which was stored in the slave chiplet preload register may be loaded, or latched, into the slave chiplet global counter stored by the slave chiplet global counter subsystem 126b. The global counter synchronization value "N" may be loaded into the slave chiplet global counter at a rising edge of the slave chiplet sleep clock that is considered to be the same sleep clock synchronization edge "n" of the master chiplet sleep clock. The slave chiplet sleep clock rising edge at which the global counter synchronization value "N" may be loaded into the slave chiplet global counter subsystem 126b may be skewed from the sleep clock synchronization edge "n." The skew between the master chiplet sleep clock at sleep clock synchronization edge "n" and the slave chiplet sleep clock may be a time difference of 1 or 2 XO clock cycles. The event 614 may be performed in a similar manner as the communication 214 as described with reference to FIG. 2.

At event 616, the slave chiplet processor 120b may poll the slave chiplet global counter subsystem 126b to determine whether the synchronization has been completed. The slave chiplet processor 120b may poll a synchronization status register (e.g., "sync status") of the slave chiplet global counter subsystem 126b to determine whether a bit or register has been changed to signify a status that the synchronization process has been completed. After the slave chiplet processor 120b determines that the synchronization between the master chiplet global counter subsystem 126a and the slave chiplet global counter subsystem 126b is completed, the master chiplet processor 120a and the slave chiplet processor 120b may continue on with normal processes, including debugging processes. Thus, upon completion of global counter synchronization, the slave chiplet processor 120b may transition from the PBL phase to the SBL phase. Once the synchronization is complete, the VIO int (sync trig) may be de-asserted before the next rising edge "n+1" of the sleep clock.

For ease of illustration and description, FIG. 6 illustrates the timing signals between two chiplets (e.g., chiplets 110a, 110b) are shown. However, the same timing signals and events that occurred in or were performed by or in conjunction with slave chiplet 110b may be simultaneously performed by additional chiplets (e.g., 110c, 110d) that are in electrical communication with the master chiplet 110a as illustrated in FIG. 1. For example, at event 612 the preload register of the slave chiplet 110d may be loaded with the value "N." As another example, at event 614, the master chiplet 110a may broadcast the global synchronization pulse trigger across the SPMI bus to reach all three slave chiplets 110b, 110c, 110d simultaneously.

Figure 7:
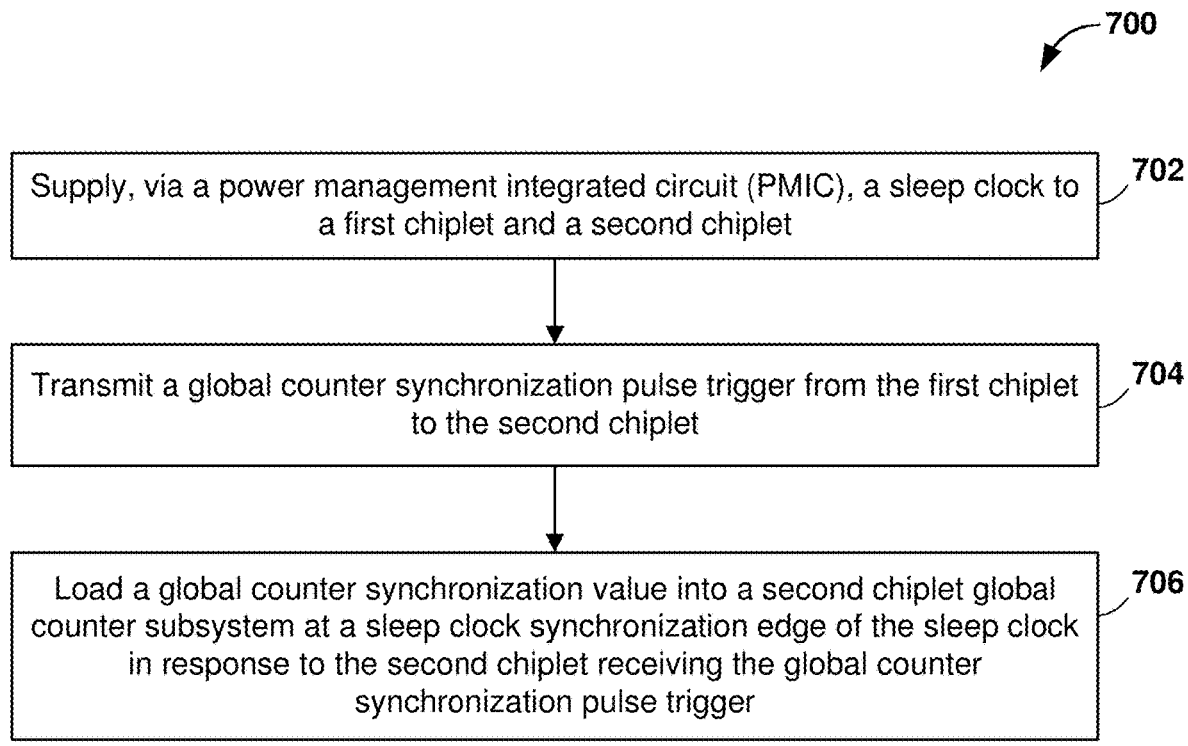
FIG. 7 is a process flow diagram illustrating an embodiment method 700 for sleep clock edge-based global counter synchronization in a multiple-chiplet system according to various embodiments.

FIG. 7 is a process flow diagram illustrating an embodiment method 700 for sleep clock edge-based global counter synchronization in a multiple-chiplet system according to various embodiments. With reference to FIGS. 1-7, the method 700 may be implemented in a processor (e.g., processing cores 120a, 120b, 120c, 120d) configured to perform operations of the method. In some embodiments, the processor (e.g., processing cores 120a, 120b, 120c, 120d) may be configured to perform the operations by processor-executable instruction stored in a non-transitory processor-readable medium (e.g., memory devices 122a, 122b, 122c, and 122d). Means for performing each of the operations of the method 700 may be a processor of the multiple-chiplet system 100, such as the processing cores 120a, 120b, 120c, 120d, and/or the like.

In block 702, a PMIC may supply a sleep clock to a first chiplet and a second chiplet. An SoC (e.g., multiple-chiplet system 100) may include a first chiplet (e.g., master chiplet 110a) including a first chiplet global counter subsystem (e.g., master chiplet global counter subsystem 126a). The SoC may include a second chiplet (e.g., slave chiplet 110b) including a second chiplet global counter subsystem (e.g., slave chiplet global counter subsystem 126b). The SoC may further include an interface bus (e.g., interface bus 106) that may communicatively couple the first chiplet and the second chiplet. The SoC may include the PMIC (e.g., PMIC controller 102), which may be configured to supply the sleep clock (e.g., sleep clock 108) to the first chiplet and the second chiplet in a star configuration. The first chiplet and the second chiplet may be configured to receive the sleep clock from the PMIC. In some embodiments, a sleep clock skew between the first chiplet and the second chiplet may be equal to or less than two crystal oscillator clock cycles.

In some embodiments, the SoC may include a third chiplet (e.g., slave chiplets 110c, 110d) including a third chiplet global counter subsystem (e.g., slave chiplet global counter subsystems 126c, 126d). The interface bus may communicatively couple the first chiplet and the third chiplet. The first chiplet may be further configured to transmit the global counter synchronization pulse trigger to the third chiplet across the interface bus. The third chiplet may be configured to load the global counter synchronization value into the third chiplet global counter subsystem at a sleep clock synchronization edge of the sleep clock in response to receiving the global counter synchronization pulse trigger.

The processes in block 702 may be performed as described with reference to operation FIG. 1. Means for performing the operations in block 702 may include a processor of the multiple-chiplet system 100, such as the processing cores 120a, 120b, 120c, 120d, and/or the like.

In block 704, a global counter synchronization pulse trigger may be transmitted from the first chiplet to the second chiplet. The first chiplet may be configured to transmit the global counter synchronization pulse trigger to the second chiplet across the interface bus. For example, the first chiplet may transmit the global counter synchronization pulse trigger as a broadcast or telegram message across an interface bus that is an SPMI. As another example, the first chiplet may transmit the global counter synchronization pulse trigger through a series of dedicated GPIO pins communicatively connecting the first chiplet to the second chiplet. The global counter synchronization pulse trigger may be configured by the first chiplet to cause the second chiplet to load a global counter synchronization value (e.g., "N") into a second chiplet global counter subsystem at a sleep clock synchronization edge (e.g., "n") of the sleep clock.

In some embodiments, the first chiplet may be configured to transmit the global counter synchronization pulse trigger to the second chiplet one sleep clock cycle before the sleep clock synchronization edge of the sleep clock. In some embodiments, the first chiplet may be configured to transmit the global counter synchronization pulse trigger to the second chiplet at a delayed time between the sleep clock synchronization edge and one sleep clock cycle before the sleep clock synchronization edge.

The processes in block 704 may be performed as described with reference to communication 214 of FIGS. 2-4, FIG. 5, and event 614 of FIG. 6. Means for performing the operations in block 704 may include a processor of the multiple-chiplet system 100, such as the processing cores 120a, 120b, 120c, 120d, and/or the like.

In block 706, a global counter synchronization value may be loaded into a second chiplet global counter subsystem at a sleep clock synchronization edge of the sleep clock in response to the second chiplet receiving the global counter synchronization pulse trigger. In response to receiving the global counter synchronization pulse trigger as described with reference to block 704, the second chiplet may be configured to load, or latch, the global counter synchronization value (e.g., "N") into the second chiplet global counter subsystem at a sleep clock synchronization edge (e.g., "n") of the sleep clock. The processes in block 706 may be performed as described with reference to communication 214 of FIGS. 2-4, FIG. 5, and event 614 of FIG. 6. Means for performing the operations in block 704 may include a processor of the multiple-chiplet system 100, such as the processing cores 120a, 120b, 120c, 120d, and/or the like.

The order of operations performed in blocks 702-706 is merely illustrative, and the operations of blocks 702-706 may be performed in any order and partially simultaneously in some embodiments. In some embodiments, the method 700 may be performed by a processor of a device independently from, but in conjunction with, an external memory device. For example, the method 700 may be implemented as a software module executing within a processor of an SoC or in dedicated hardware within an SoC that issues commands to establish secure memory channels and access memory of an external memory device and is otherwise configured to take actions and store data as described.

Figure 8A:
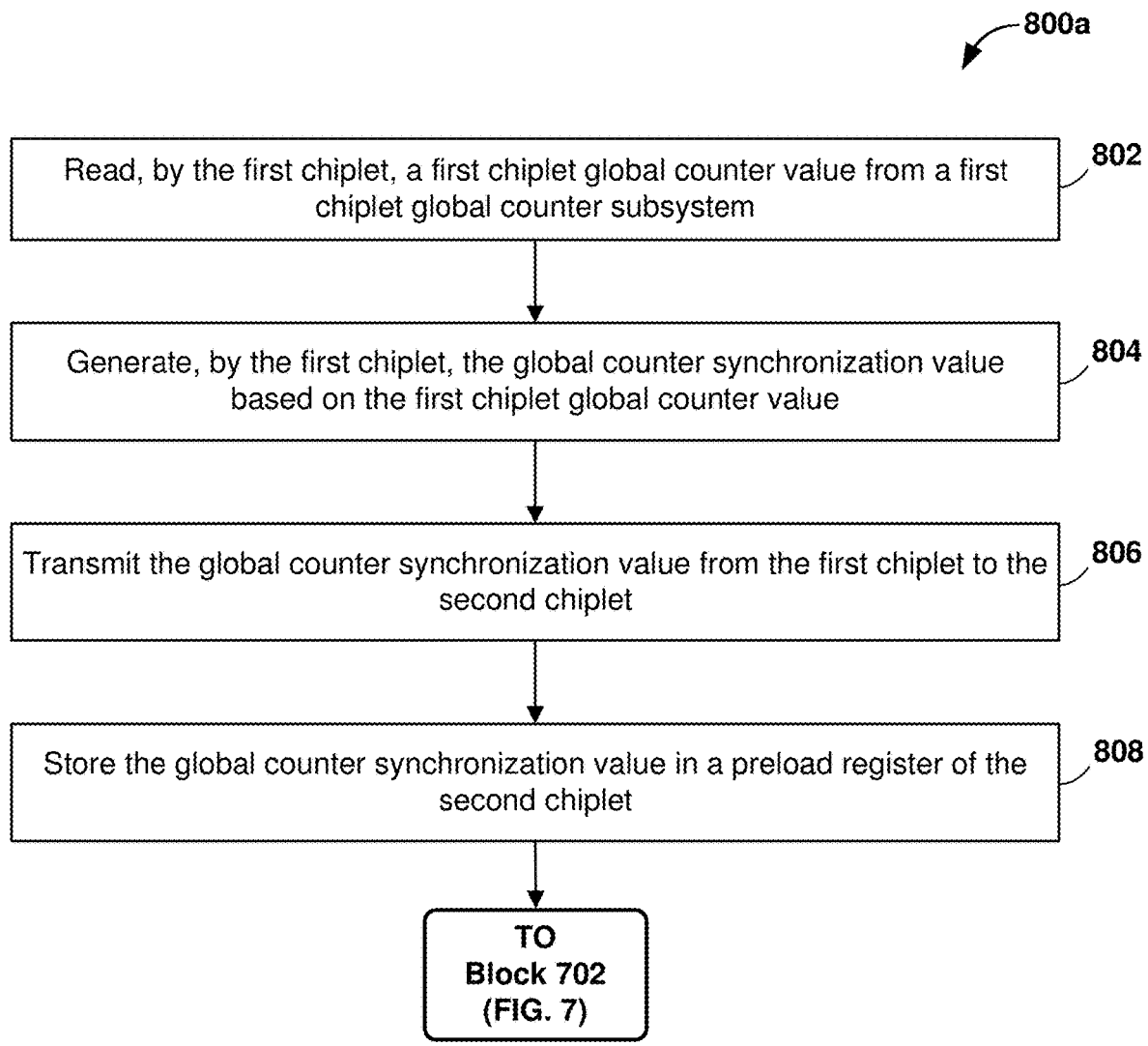
FIG. 8A is a process flow diagram illustrating an embodiment method 800a sleep clock edge-based global counter synchronization in a multiple-chiplet system that may be implemented as part of the method 700 in some embodiments.

FIG. 8A is a process flow diagram illustrating an embodiment method 800a sleep clock edge-based global counter synchronization in a multiple-chiplet system that may be implemented as part of the method 700 in some embodiments. With reference to FIGS. 1-8A, the method 800a may be implemented in a processor (e.g., processing cores 120a, 120b, 120c, 120d) configured to perform operations of the method. In some embodiments, the processor (e.g., processing cores 120a, 120b, 120c, 120d) may be configured to perform the operations by processor-executable instruction stored in a non-transitory processor-readable medium (e.g., memory devices 122a, 122b, 122c, and 122d). Means for performing each of the operations of the method 800a may be a processor of the multiple-chiplet system 100, such as the processing cores 120a, 120b, 120c, 120d, and/or the like.

In block 802, a first chiplet global counter value may be read by the first chiplet from a first chiplet global counter subsystem. The first chiplet (e.g., master chiplet 110a) may be configured to read or otherwise receive a first chiplet global counter value from the first chiplet global counter subsystem (e.g., master chiplet global counter subsystem 126a). In some embodiments, the first chiplet global counter value may be read from the first chiplet global counter subsystem at a rising edge of the sleep clock. The processes in block 802 may be performed as described with reference to communication 208 of FIGS. 2-4, and event 606 of FIG. 6. Means for performing the operations in block 802 may include a processor of the multiple-chiplet system 100, such as the processing cores 120a, 120b, 120c, 120d, and/or the like.

In block 804, the global counter synchronization value may be generated by the first chiplet based on the first chiplet global counter value. The first chiplet (e.g., master chiplet 110a) may be configured to generate the global counter synchronization value (e.g., "N") based on the first chiplet global counter value previously read as described with reference to block 802. The processes in block 804 may be performed as described with reference to event 610 of FIG. 6. Means for performing the operations in block 804 may include a processor of the multiple-chiplet system 100, such as the processing cores 120a, 120b, 120c, 120d, and/or the like.

In block 806, the global counter synchronization value may be transmitted from the first chiplet to the second chiplet. The first chiplet (e.g., master chiplet 110a) may be configured to transmit the global counter synchronization value (e.g., "N") to the second chiplet (e.g., slave chiplet 110b). For example, the first chiplet may transmit the global counter synchronization value as a broadcast or telegram message across an interface bus that is an SPMI. As another example, the first chiplet may transmit the global counter synchronization value through a series of dedicated GPIO pins communicatively connecting the first chiplet to the second chiplet. The processes in block 806 may be performed as described with reference to communication 212 of FIGS. 2-4, and event 612 of FIG. 6. Means for performing the operations in block 806 may include a processor of the multiple-chiplet system 100, such as the processing cores 120a, 120b, 120c, 120d, and/or the like.

In block 808, the global counter synchronization value may be stored in a preload register of the second chiplet. The second chiplet (e.g., slave chiplet 110b) may be configured to store the global counter synchronization value (e.g., "N") in a preload register, in which the global counter synchronization value may be loaded into the second chiplet global counter subsystem (e.g., slave chiplet global counter subsystem 126b) from the preload register. The processes in block 808 may be performed as described with reference to communication 212 of FIGS. 2-4, and event 612 of FIG. 6. The multiple-chiplet system 100 may continue to perform operations of block 702 of the method 700 (FIG. 7) as described. Means for performing the operations in block 808 may include a processor of the multiple-chiplet system 100, such as the processing cores 120a, 120b, 120c, 120d, and/or the like.

The order of operations performed in blocks 802-808 is merely illustrative, and the operations of blocks 802-808 may be performed in any order and partially simultaneously in some embodiments. In some embodiments, the method 800a may be performed by a processor of a device independently from, but in conjunction with, an external memory device. For example, the method 800a may be implemented as a software module executing within a processor of an SoC or in dedicated hardware within an SoC that issues commands to establish secure memory channels and access memory of an external memory device and is otherwise configured to take actions and store data as described.

Figure 8B:
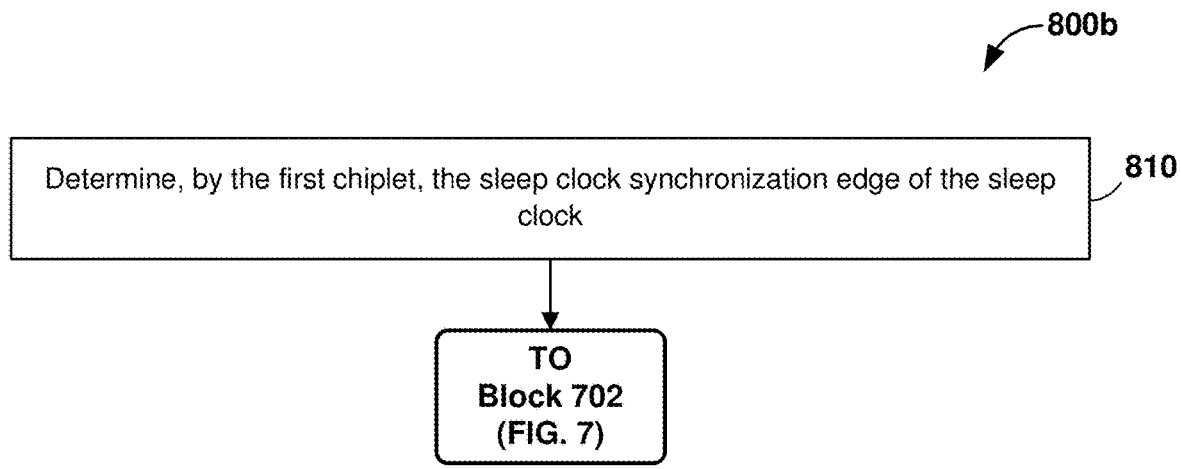
FIG. 8B is a process flow diagram illustrating an embodiment method 800b sleep clock edge-based global counter synchronization in a multiple-chiplet system that may be implemented as part of the method 700 in some embodiments.

FIG. 8B is a process flow diagram illustrating an embodiment method 800b sleep clock edge-based global counter synchronization in a multiple-chiplet system that may be implemented as part of the method 700 in some embodiments. With reference to FIGS. 1-8B, the method 800b may be implemented in a processor (e.g., processing cores 120a, 120b, 120c, 120d) configured to perform operations of the method. In some embodiments, the processor (e.g., processing cores 120a, 120b, 120c, 120d) may be configured to perform the operations by processor-executable instruction stored in a non-transitory processor-readable medium (e.g., memory devices 122a, 122b, 122c, and 122d).

In block 810, the first chiplet may determine the sleep clock synchronization edge of the sleep clock. The first chiplet (e.g., master chiplet 110a) may be configured to determine the sleep clock synchronization edge (e.g., "n") of the sleep clock (e.g., sleep clock 108), in which the sleep clock synchronization edge may be a rising edge of the sleep clock. The processes in block 810 may be performed as described with reference to operation 209 of FIGS. 2-4, and event 610 of FIG. 6. Means for performing the operations in block 810 may include a processor of the multiple-chiplet system 100, such as the processing cores 120a, 120b, 120c, 120d, and/or the like. The multiple-chiplet system 100 may continue to perform operations of block 702 of the method 700 (FIG. 7) as described.

In some embodiments, the method 800b may be performed by a processor of a device independently from, but in conjunction with, an external memory device. For example, the method 800b may be implemented as a software module executing within a processor of an SoC or in dedicated hardware within an SoC that issues commands to establish secure memory channels and access memory of an external memory device and is otherwise configured to take actions and store data as described.

Figure 8C:
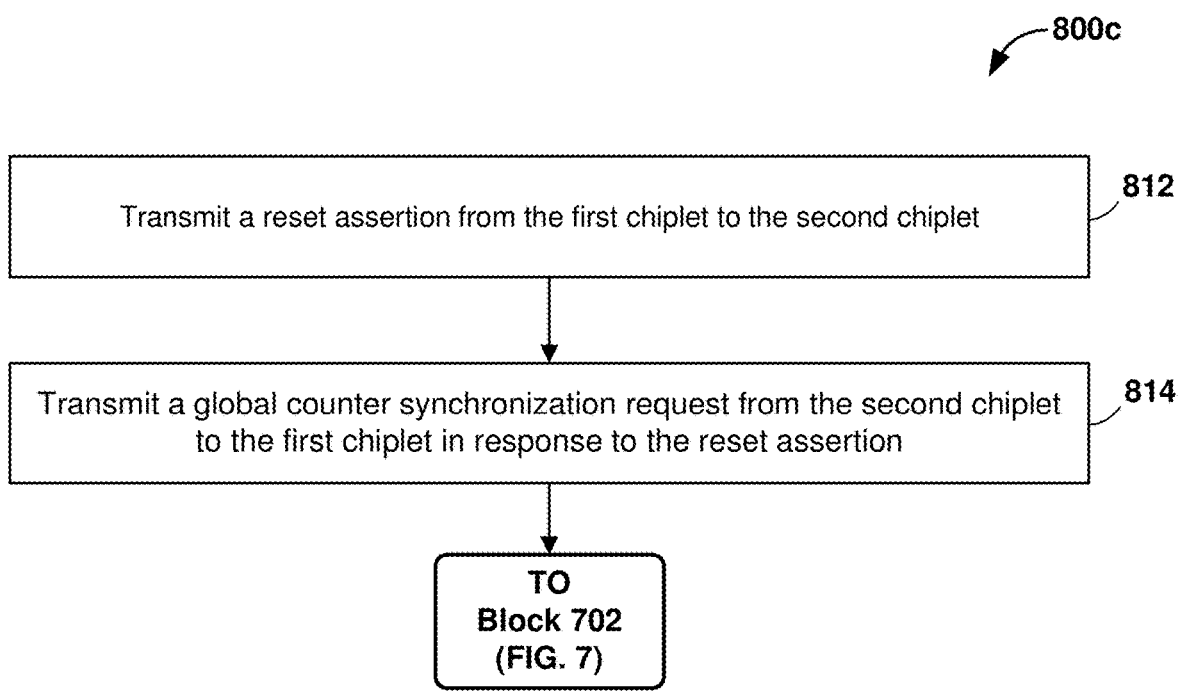
FIG. 8C is a process flow diagram illustrating an embodiment method 800c sleep clock edge-based global counter synchronization in a multiple-chiplet system that may be implemented as part of the method 700 in some embodiments.

FIG. 8C is a process flow diagram illustrating an embodiment method 800c sleep clock edge-based global counter synchronization in a multiple-chiplet system that may be implemented as part of the method 700 in some embodiments. With reference to FIGS. 1-8C, the method 800c may be implemented in a processor (e.g., processing cores 120a, 120b, 120c, 120d) configured to perform operations of the method. In some embodiments, the processor (e.g., processing cores 120a, 120b, 120c, 120d) may be configured to perform the operations by processor-executable instruction stored in a non-transitory processor-readable medium (e.g., memory devices 122a, 122b, 122c, and 122d).

In block 812, the first chiplet may transmit a reset assertion to the second chiplet. The first chiplet (e.g., master chiplet 110a) may be configured to transmit a reset assertion to the second chiplet (e.g., slave chiplet 110b) across a hardwired dedicated channel. For example, the first chiplet may transmit the reset assertion through a series of dedicated GPIO pins communicatively connecting the first chiplet to the second chiplet. The reset assertion received by the slave chiplet may trigger the slave chiplet to enter a PBL phase. The processes in block 812 may be performed as described with reference to communication 202 of FIG. 2, and event 602 of FIG. 6. Means for performing the operations in block 812 may include a processor of the multiple-chiplet system 100, such as the processing cores 120a, 120b, 120c, 120d, and/or the like.

In block 814, the second chiplet may transmit a global counter synchronization request to the first chiplet in response to the reset assertion. The second chiplet (e.g., slave chiplet 110b) may be configured to transmit a global counter synchronization request to the first chiplet (e.g., master chiplet 110a) in response to receiving the reset assertion from the first chiplet as described with reference to block 812. For example, the second chiplet may transmit the global counter synchronization request as a broadcast or telegram message across an interface bus that is an SPMI. As another example, the second chiplet may transmit the global counter synchronization request through a series of dedicated GPIO pins communicatively connecting the first chiplet to the second chiplet. The multiple-chiplet system 100 may continue to perform operations of block 702 of the method 700 (FIG. 7) as described. For example, the first chiplet may be configured to transmit the global counter synchronization pulse trigger to the second chiplet across the interface bus in response to the first chiplet receiving the global counter synchronization request from the second chiplet. The processes in block 814 may be performed as described with reference to communication 204 of FIG. 2 and events 604a and 604b of FIG. 6. Means for performing the operations in block 814 may include a processor of the multiple-chiplet system 100, such as the processing cores 120a, 120b, 120c, 120d, and/or the like.

In some embodiments, the method 800c may be performed by a processor of a device independently from, but in conjunction with, an external memory device. For example, the method 800c may be implemented as a software module executing within a processor of an SoC or in dedicated hardware within an SoC that issues commands to establish secure memory channels and access memory of an external memory device and is otherwise configured to take actions and store data as described.

Figure 8D:
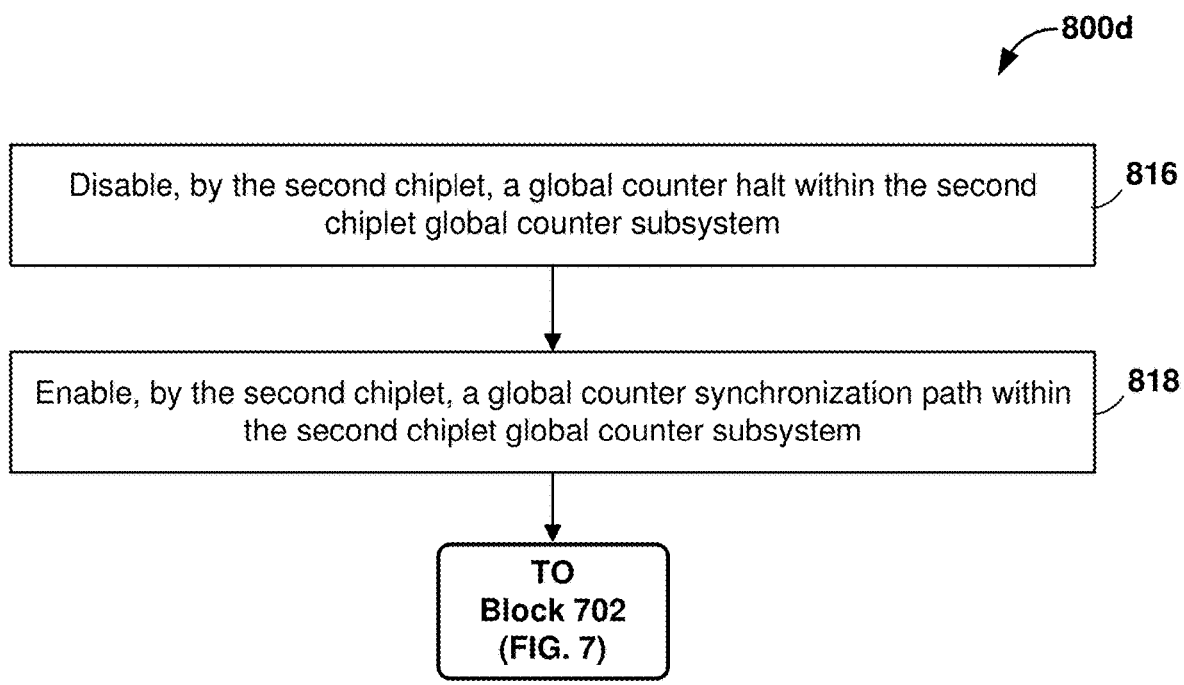
FIG. 8D is a process flow diagram illustrating an embodiment method 800d sleep clock edge-based global counter synchronization in a multiple-chiplet system that may be implemented as part of the method 700 in some embodiments.

FIG. 8D is a process flow diagram illustrating an embodiment method 800d sleep clock edge-based global counter synchronization in a multiple-chiplet system that may be implemented as part of the method 700 in some embodiments. With reference to FIGS. 1-8D, the method 800d may be implemented in a processor (e.g., processing cores 120a, 120b, 120c, 120d) configured to perform operations of the method. In some embodiments, the processor (e.g., processing cores 120a, 120b, 120c, 120d) may be configured to perform the operations by processor-executable instruction stored in a non-transitory processor-readable medium (e.g., memory devices 122a, 122b, 122c, and 122d).

In block 816, the second chiplet may disable a global counter halt within the second chiplet global counter subsystem. The second chiplet (e.g., slave chiplet 110b) may be configured to disable a global counter halt within the second chiplet global counter subsystem (e.g., slave chiplet global counter subsystem 126b). The global counter halt may be a CTI halt trigger. Disabling the global counter halt may reinitiate counting of a second chiplet global counter within the second chiplet global counter subsystem. The processes in block 816 may be performed as described with reference to communication 301 of FIG. 3. Means for performing the operations in block 816 may include a processor of the multiple-chiplet system 100, such as the processing cores 120a, 120b, 120c, 120d, and/or the like.

In block 818, the second chiplet may enable a global counter synchronization path within the second chiplet global counter subsystem. The second chiplet (e.g., slave chiplet 110b) may be configured to enable a global counter synchronization path within the second chiplet global counter subsystem (e.g., slave chiplet global counter subsystem 126b). Enabling the global counter synchronization path may allow the first chiplet global counter subsystem (e.g., master chiplet global counter subsystem 126a) to communicate with the second chiplet global counter subsystem. The multiple-chiplet system 100 may continue to perform operations of block 702 of the method 700 (FIG. 7) as described. The processes in block 818 may be performed as described with reference to communication 303 of FIG. 3. Means for performing the operations in block 818 may include a processor of the multiple-chiplet system 100, such as the processing cores 120a, 120b, 120c, 120d, and/or the like.

The order of operations performed in blocks 816 and 818 is merely illustrative, and the operations of blocks 816-818 may be performed in any order and partially simultaneously in some embodiments. In some embodiments, the method 800d may be performed by a processor of a device independently from, but in conjunction with, an external memory device. For example, the method 800d may be implemented as a software module executing within a processor of an SoC or in dedicated hardware within an SoC that issues commands to establish secure memory channels and access memory of an external memory device and is otherwise configured to take actions and store data as described.

Figure 8E:
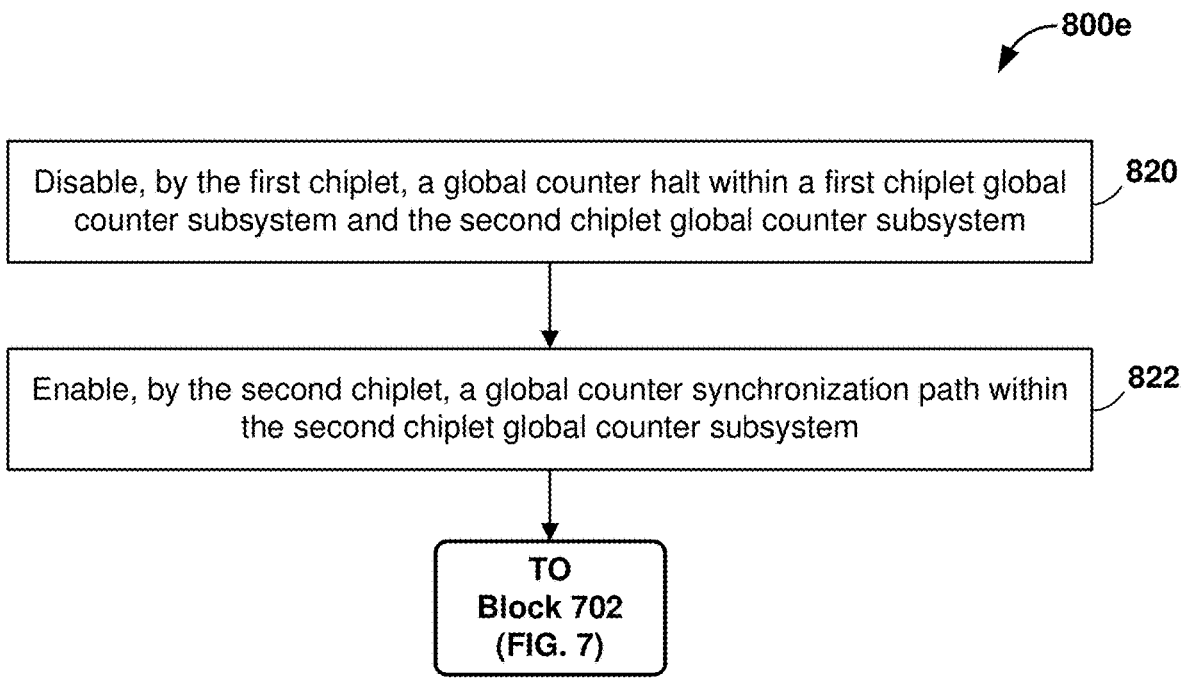
FIG. 8E is a process flow diagram illustrating an embodiment method 800e sleep clock edge-based global counter synchronization in a multiple-chiplet system that may be implemented as part of the method 700 in some embodiments.

FIG. 8E is a process flow diagram illustrating an embodiment method 800e sleep clock edge-based global counter synchronization in a multiple-chiplet system that may be implemented as part of the method 700 in some embodiments. With reference to FIGS. 1-8E, the method 800e may be implemented in a processor (e.g., processing cores 120a, 120b, 120c, 120d) configured to perform operations of the method. In some embodiments, the processor (e.g., processing cores 120a, 120b, 120c, 120d) may be configured to perform the operations by processor-executable instruction stored in a non-transitory processor-readable medium (e.g., memory devices 122a, 122b, 122c, and 122d).

In block 820, the first chiplet may disable a global counter halt within the first chiplet global counter subsystem and the second chiplet global counter subsystem. The first chiplet (e.g., master chiplet 110a) may disable a global counter halt within the first chiplet global counter subsystem (e.g., master chiplet global counter subsystem 126a) and the second chiplet global counter subsystem (e.g., slave chiplet global counter subsystem 126b). The global counter halt may be a CTI halt trigger. Disabling the global counter halt may reinitiate counting of a first chiplet global counter within the first chiplet global counter subsystem and may reinitiate counting of a second chiplet global counter within the second chiplet global counter subsystem. The processes in block 820 may be performed as described with reference to communications 401 and 402 of FIG. 4. Means for performing the operations in block 820 may include a processor of the multiple-chiplet system 100, such as the processing cores 120a, 120b, 120c, 120d, and/or the like.

In block 822, the second chiplet may enable a global counter synchronization path within the second chiplet global counter subsystem. The second chiplet (e.g., slave chiplet 110b) may be configured to enable a global counter synchronization path within the second chiplet global counter subsystem (e.g., slave chiplet global counter subsystem 126b). Enabling the global counter synchronization path may allow the first chiplet global counter subsystem (e.g., master chiplet global counter subsystem 126a) to communicate with the second chiplet global counter subsystem. The multiple-chiplet system 100 may continue to perform operations of block 702 of the method 700 (FIG. 7) as described. The processes in block 822 may be performed as described with reference to communication 403 of FIG. 4. Means for performing the operations in block 822 may include a processor of the multiple-chiplet system 100, such as the processing cores 120a, 120b, 120c, 120d, and/or the like.

The order of operations performed in blocks 820 and 822 is merely illustrative, and the operations of blocks 820-822 may be performed in any order and partially simultaneously in some embodiments. In some embodiments, the method 800e may be performed by a processor of a device independently from, but in conjunction with, an external memory device. For example, the method 800e may be implemented as a software module executing within a processor of an SoC or in dedicated hardware within an SoC that issues commands to establish secure memory channels and access memory of an external memory device and is otherwise configured to take actions and store data as described.

Figure 9:
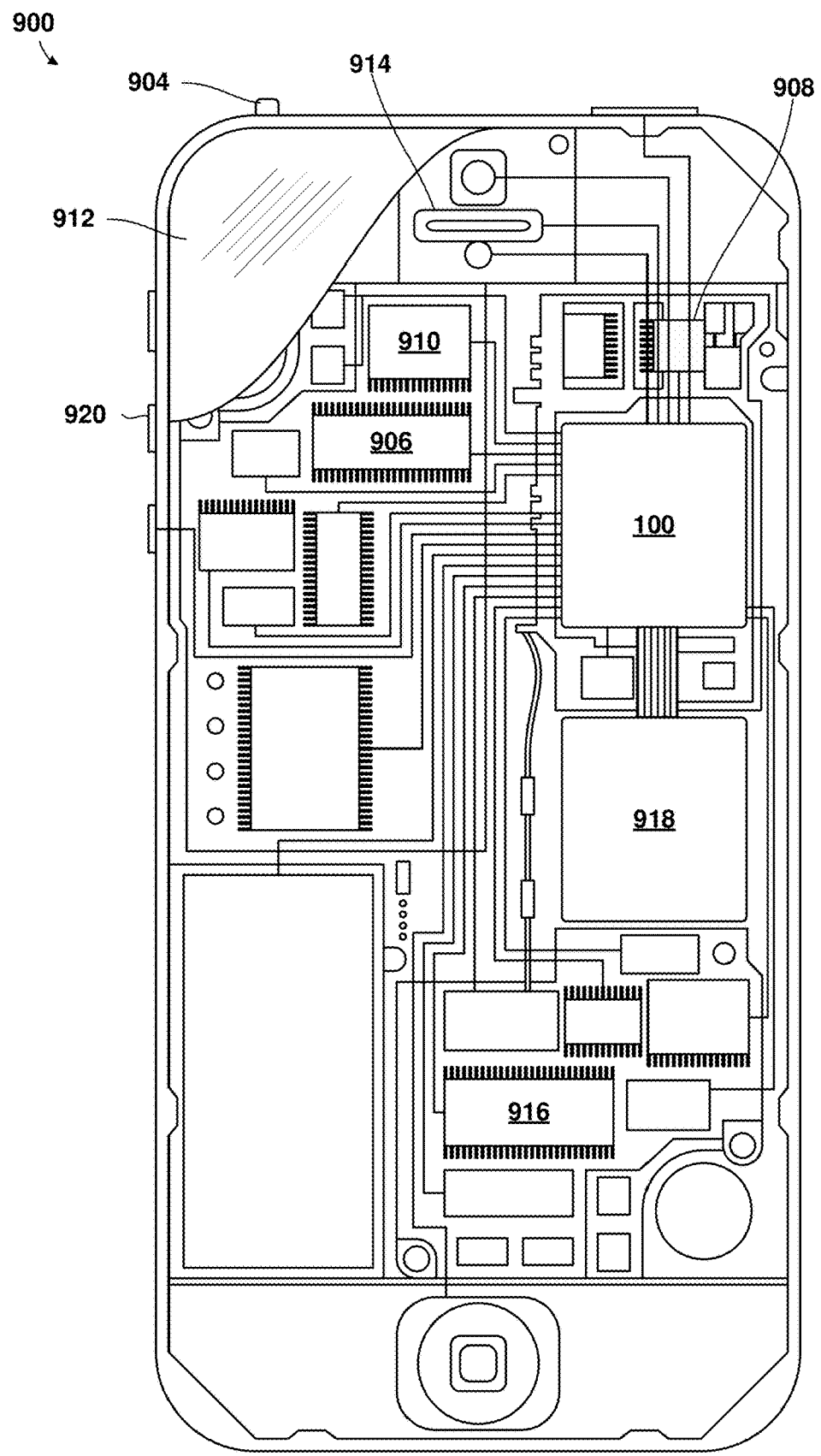
FIG. 9 is a component block diagram of an example wireless device in the form of a smartphone 1100 suitable for implementing various embodiments.

FIG. 9 is a component block diagram of an example wireless device in the form of a smartphone 900 suitable for implementing some embodiments. A smartphone 900 may include a first processing device such as multiple-chiplet system 100 coupled to a second processing device such as an SoC 918. The multiple-chiplet system 100 and SoC 918 may be 5G capable SoCs. The multiple-chiplet system 100 and the SoC 918 may be coupled to internal memory 906, 916, a display 912, and to a speaker 914. Additionally, the smartphone 900 may include an antenna 904 for sending and receiving electromagnetic radiation that may be connected to a wireless data link or cellular telephone transceiver 908 coupled to one or more processors in the multiple-chiplet system 100 and the SoC 918. Smartphones 900 typically also include menu selection buttons or rocker switches 920 for receiving user inputs.

A typical smartphone 900 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the multiple-chiplet system 100 and the SoC 918, wireless transceiver 908 and CODEC 910 may include a digital signal processor (DSP) circuit (not shown separately).

The processors of the smart phone 900 may be any programmable microprocessor, microcomputer or multiple processor chip or chips that may be configured by processor-executable instructions to perform a variety of functions, including the functions of the various implementations described herein. In some mobile devices, multiple processors may be provided, such as one processor within a multiple-chiplet system 100 dedicated to wireless communication functions and one processor within an SoC 918 dedicated to running other applications. Typically, software applications may be stored in the memory 906, 916 before they are accessed and loaded into the processor. The processors may include internal memory sufficient to store the application software instructions.

Figure 10:
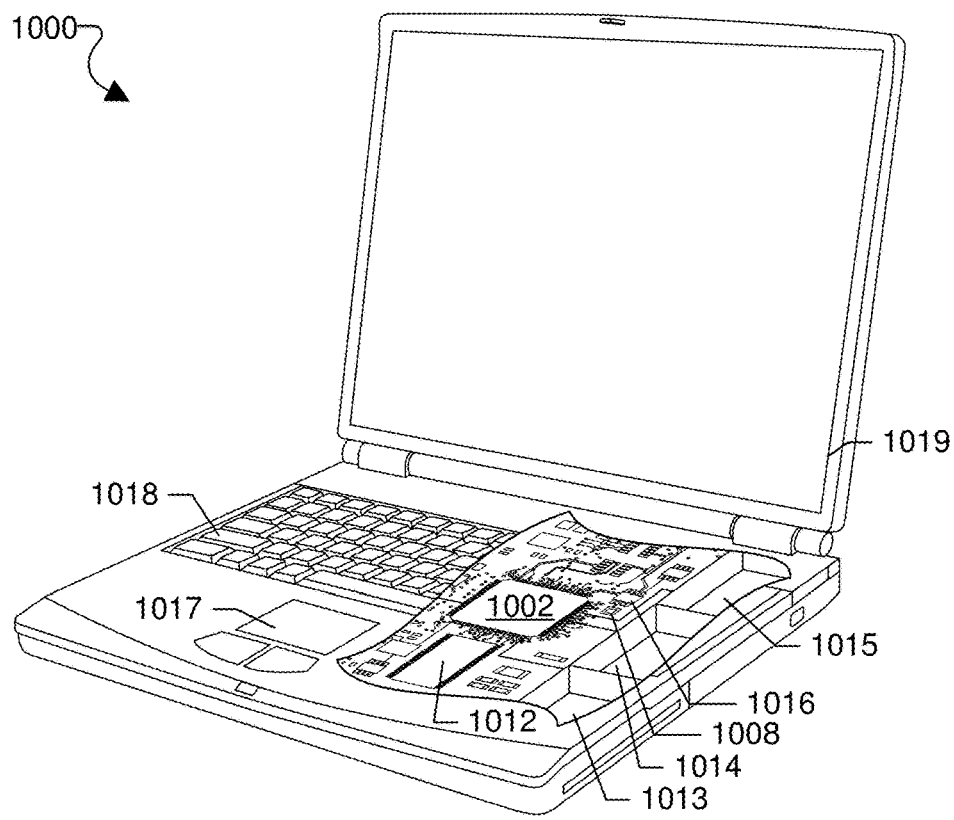
FIG. 10 is a component block diagram illustrating an example computing device suitable for use with the various embodiments.

The various embodiments (including, but not limited to, embodiments described above with reference to FIGS. 1-8E) may be implemented in a wide variety of computing systems include a laptop computer 1000 an example of which is illustrated in FIG. 10. With reference to FIGS. 1-10, a laptop computer may include a touchpad touch surface 1017 that serves as the computer's pointing device, and thus may receive drag, scroll, and flick gestures similar to those implemented on computing devices equipped with a touch screen display and described above. A laptop computer 1000 will typically include a processor 1002 coupled to volatile memory 1012 and a large capacity nonvolatile memory, such as a disk drive 1013 of Flash memory. Additionally, the computer 1000 may have one or more antenna 1008 for sending and receiving electromagnetic radiation that may be connected to a wireless data link and/or cellular telephone transceiver 1016 coupled to the processor 1002. The computer 1000 may also include a floppy disc drive 1014 and a compact disc (CD) drive 1015 coupled to the processor 1002. The laptop computer 1000 may include a touchpad 1017, a keyboard 1018, and a display 1019 all coupled to the processor 1002. Other configurations of the computing device may include a computer mouse or trackball coupled to the processor (e.g., via a Universal Serial Bus (USB) input) as are well known, which may also be used in conjunction with the various embodiments.

Figure 11:
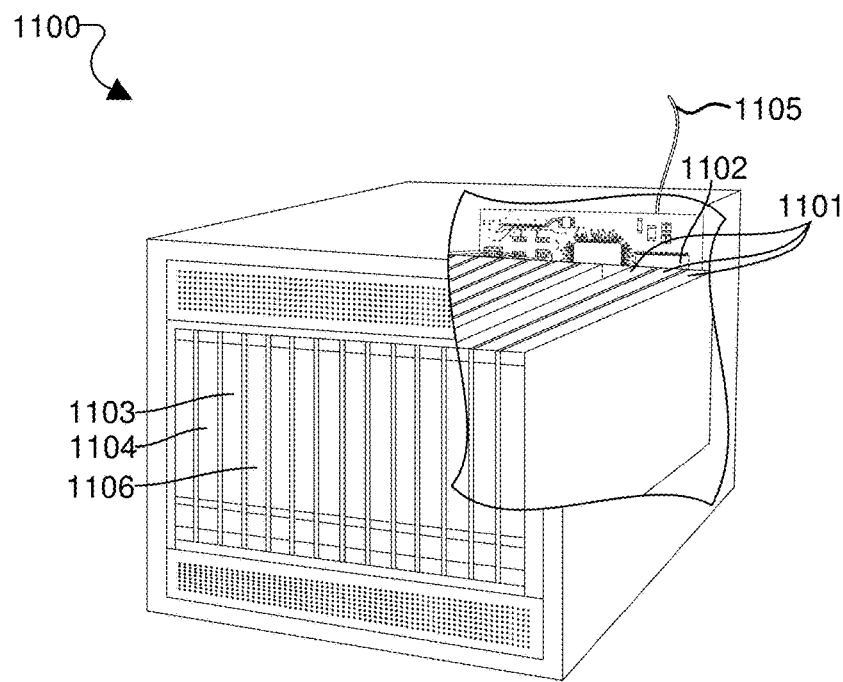
FIG. 11 is a component block diagram illustrating an example server suitable for use with the various embodiments.

The various embodiments (including, but not limited to, embodiments described above with reference to FIGS. 1-8E) may also be implemented in fixed computing systems, such as any of a variety of commercially available servers. With reference to FIGS. 1-11, an example server 1100 is illustrated in FIG. 11. Such a server 1100 typically includes one or more multicore processor assemblies 1101 coupled to volatile memory 1102 and a large capacity nonvolatile memory, such as a disk drive 1104. As illustrated in FIG. 11, multicore processor assemblies 1101 may be added to the server 1100 by inserting them into the racks of the assembly. The server 1100 may also include a floppy disc drive, compact disc (CD) or digital versatile disc (DVD) disc drive 1106 coupled to the processor 1101. The server 1100 may also include network access ports 1103 coupled to the multicore processor assemblies 1101 for establishing network interface connections with a network 1105, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Implementation examples are described in the following paragraphs. Implementation examples described in terms of example methods further include: the example methods implemented in circuitry and processors configured with processor-executable instructions to perform operations of the example methods; the example methods implemented in means for performing functions of the methods; and the example methods implemented in a non-transitory processor-readable storage medium having stored thereon processor-executable instructions configured to cause a chiplet processor to perform operations of the example methods.

Example 1. A system-on-a-chip (SoC) including: a first chiplet including a first chiplet global counter subsystem; a second chiplet including a second chiplet global counter subsystem; an interface bus communicatively coupling the first chiplet and the second chiplet; and a power management integrated circuit (PMIC) configured to supply a sleep clock to the first chiplet and the second chiplet, in which: the first chiplet is configured to transmit a global counter synchronization pulse trigger to the second chiplet across the interface bus; and the second chiplet is configured to load a global counter synchronization value into the second chiplet global counter subsystem at a sleep clock synchronization edge of the sleep clock in response to receiving the global counter synchronization pulse trigger.

Example 2. The SoC of example 1, in which: the first chiplet is further configured to: read a first chiplet global counter value from the first chiplet global counter subsystem; generate the global counter synchronization value based on the first chiplet global counter value; transmit the global counter synchronization value to the second chiplet across the interface bus; and the second chiplet is further configured to store the global counter synchronization value in a preload register, in which the global counter synchronization value is loaded into the second chiplet global counter subsystem from the preload register.

Example 3. The SoC of example 2, in which the first chiplet global counter value is read from the first chiplet global counter subsystem at a rising edge of the sleep clock.

Example 4. The SoC of any of examples 1-3, in which the first chiplet is further configured to determine the sleep clock synchronization edge of the sleep clock, in which the sleep clock synchronization edge is a rising edge of the sleep clock.

Example 5. The SoC of any of examples 1-4, in which the first chiplet is further configured to transmit the global counter synchronization pulse trigger to the second chiplet one sleep clock cycle before the sleep clock synchronization edge of the sleep clock.

Example 6. The SoC of any of examples 1-5, in which the first chiplet is further configured to transmit the global counter synchronization pulse trigger to the second chiplet at a delayed time between the sleep clock synchronization edge and one sleep clock cycle before the sleep clock synchronization edge.

Example 7. The SoC of any of examples 1-6, in which: the first chiplet is further configured to transmit a reset assertion to the second chiplet; and the second chiplet is further configured to transmit a global counter synchronization request to the first chiplet across the interface bus in response to the reset assertion, in which the first chiplet is configured to transmit the global counter synchronization pulse trigger to the second chiplet across the interface bus in response to the first chiplet receiving the global counter synchronization request from the second chiplet.

Example 8. The SoC of any of examples 1-7, in which the second chiplet is further configured to: disable a global counter halt within the second chiplet global counter subsystem, in which disabling the global counter halt reinitiates counting of a second chiplet global counter within the second chiplet global counter subsystem; and enable a global counter synchronization path within the second chiplet global counter subsystem, in which enabling the global counter synchronization path allows the first chiplet global counter subsystem to communicate with the second chiplet global counter subsystem.

Example 9. The SoC of any of examples 1-8, in which: the first chiplet is further configured to disable a global counter halt within the first chiplet global counter subsystem and the second chiplet global counter subsystem, in which disabling the global counter halt reinitiates counting of a first chiplet global counter within the first chiplet global counter subsystem and reinitiates counting of a second chiplet global counter within the second chiplet global counter subsystem; and the second chiplet is further configured to enable a global counter synchronization path within the second chiplet global counter subsystem, in which enabling the global counter synchronization path allows the first chiplet global counter subsystem to communicate with the second chiplet global counter subsystem.

Example 10. The SoC of any of examples 1-9, in which a sleep clock skew between the first chiplet and the second chiplet equal to or less than two crystal oscillator clock cycles, and in which the sleep clock is distributed to the first chiplet and the second chiplet in a star configuration.

Example 11. The SoC of any of examples 1-10, further including: a third chiplet including a third chiplet global counter subsystem, in which the interface bus communicatively couples the first chiplet and the third chiplet; and in which: the first chiplet is further configured to transmit the global counter synchronization pulse trigger to the third chiplet across the interface bus; and the third chiplet is configured to load the global counter synchronization value into the third chiplet global counter subsystem at the sleep clock synchronization edge of the sleep clock in response to receiving the global counter synchronization pulse trigger.

Example 12. The SoC of any of examples 1-11, in which the interface bus is an SPMI bus.

Example 13. A method for global counter synchronization within a multiple-chiplet system, including: supplying, via a power management integrated circuit (PMIC), a sleep clock to a first chiplet and a second chiplet; transmitting a global counter synchronization pulse trigger from the first chiplet to the second chiplet; and loading a global counter synchronization value into a second chiplet global counter subsystem at a sleep clock synchronization edge of the sleep clock in response to the second chiplet receiving the global counter synchronization pulse trigger.

Example 14. The method of example 13, further including: reading, by the first chiplet, a first chiplet global counter value from a first chiplet global counter subsystem; generating, by the first chiplet, the global counter synchronization value based on the first chiplet global counter value; transmitting the global counter synchronization value from the first chiplet to the second chiplet; and storing the global counter synchronization value in a preload register of the second chiplet, in which the global counter synchronization value is loaded into the second chiplet global counter subsystem from the preload register.

Example 15. The method of example 14, in which the first chiplet global counter value is read from the first chiplet global counter subsystem at a rising edge of the sleep clock.

Example 16. The method of any of examples 13-15, further including: determining, by the first chiplet, the sleep clock synchronization edge of the sleep clock, in which the sleep clock synchronization edge is a rising edge of the sleep clock.

Example 17. The method of any of examples 13-16, further including: transmitting the global counter synchronization pulse trigger from the first chiplet to the second chiplet one sleep clock cycle before the sleep clock synchronization edge of the sleep clock.

Example 18. The method of any of examples 13-17, further including: transmitting the global counter synchronization pulse trigger from the first chiplet to the second chiplet at a delayed time between the sleep clock synchronization edge and one sleep clock cycle before the sleep clock synchronization edge.

Example 19. The method of any of examples 13-18, further including: transmitting a reset assertion from the first chiplet to the second chiplet; and transmitting a global counter synchronization request from the second chiplet to the first chiplet in response to the reset assertion, in which transmitting the global counter synchronization pulse trigger from the first chiplet to the second chiplet is in response to the first chiplet receiving the global counter synchronization request from the second chiplet.

Example 20. The method of any of examples 13-19, further including: disabling, by the second chiplet, a global counter halt within the second chiplet global counter subsystem, in which disabling the global counter halt reinitiates counting of a second chiplet global counter within the second chiplet global counter subsystem; and enabling, by the second chiplet, a global counter synchronization path within the second chiplet global counter subsystem, in which enabling the global counter synchronization path allows a first chiplet global counter subsystem to communicate with the second chiplet global counter subsystem.

Example 21. The method of any of examples 13-20, further including: disabling, by the first chiplet, a global counter halt within a first chiplet global counter subsystem and the second chiplet global counter subsystem, in which disabling the global counter halt reinitiates counting of a first chiplet global counter within the first chiplet global counter subsystem and reinitiates counting of a second chiplet global counter within the second chiplet global counter subsystem; and enabling, by the second chiplet, a global counter synchronization path within the second chiplet global counter subsystem, in which enabling the global counter synchronization path allows the first chiplet global counter subsystem to communicate with the second chiplet global counter subsystem.

Example 22. A method for global counter synchronization implemented by a first chiplet within a multiple-chiplet system, including: receiving, from a power management integrated circuit (PMIC), a sleep clock; and transmitting a global counter synchronization pulse trigger to a second chiplet; in which the global counter synchronization pulse trigger is configured to cause the second chiplet to load a global counter synchronization value into a second chiplet global counter subsystem at a sleep clock synchronization edge of the sleep clock.

Example 32. The method of example 22, further including: reading a first chiplet global counter value from a first chiplet global counter subsystem; generating the global counter synchronization value based on the first chiplet global counter value; and transmitting the global counter synchronization value to the second chiplet.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon.

Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various implementations. Such services and standards include, such as third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (such as cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, or content messages. It should be understood that any references to terminology or technical details related to an individual telecommunication standard or technology are for illustrative purposes only, and are not intended to limit the scope of the claims to a particular communication system or technology unless specifically recited in the claim language.

Various implementations illustrated and described are provided merely as examples to illustrate various features of the claims. However, features shown and described with respect to any given implementation are not necessarily limited to the associated implementation and may be used or combined with other implementations that are shown and described. Further, the claims are not intended to be limited by any one example implementation. For example, one or more of the operations of the methods disclosed herein may be substituted for or combined with one or more operations of the methods disclosed herein.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of various embodiments.

The hardware used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

Computer program code or "program code" for execution on a programmable processor for carrying out operations of the various embodiments may be written in a high-level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the scope of the embodiments. Thus, various embodiments are not intended to be limited to the embodiments shown herein but are to be accorded the widest scope consistent with the following claims and the principles and novel features disclosed herein.

What is claimed is:

1. A system-on-a-chip (SoC), comprising:
a first chiplet including a first chiplet global counter subsystem;
a second chiplet including a second chiplet global counter subsystem;
an interface bus communicatively coupling the first chiplet and the second chiplet; and
a power management integrated circuit (PMIC) configured to supply a sleep clock to the first chiplet and the second chiplet, wherein:
the first chiplet is configured to transmit a global counter synchronization pulse trigger to the second chiplet one sleep clock cycle before a sleep clock synchronization edge of the sleep clock across the interface bus; and
the second chiplet is configured to load a global counter synchronization value into the second chiplet global counter subsystem at the sleep clock synchronization edge of the sleep clock in response to receiving the global counter synchronization pulse trigger.

2. The SoC of claim 1, wherein:
the first chiplet is further configured to:
read a first chiplet global counter value from the first chiplet global counter subsystem;
generate the global counter synchronization value based on the first chiplet global counter value;
transmit the global counter synchronization value to the second chiplet across the interface bus; and
the second chiplet is further configured to store the global counter synchronization value in a preload register, wherein the global counter synchronization value is loaded into the second chiplet global counter subsystem from the preload register.

3. The SoC of claim 2, wherein the first chiplet global counter value is read from the first chiplet global counter subsystem at a rising edge of the sleep clock.

4. The SoC of claim 1, wherein the first chiplet is further configured to determine the sleep clock synchronization edge of the sleep clock, wherein the sleep clock synchronization edge is a rising edge of the sleep clock.

5. The SoC of claim 1, wherein the first chiplet is further configured to transmit the global counter synchronization pulse trigger to the second chiplet at a delayed time between the sleep clock synchronization edge and one sleep clock cycle before the sleep clock synchronization edge.

6. The SoC of claim 1, wherein:
the first chiplet is further configured to transmit a reset assertion to the second chiplet; and
the second chiplet is further configured to transmit a global counter synchronization request to the first chiplet across the interface bus in response to the reset assertion,
wherein the first chiplet is configured to transmit the global counter synchronization pulse trigger to the second chiplet across the interface bus in response to the first chiplet receiving the global counter synchronization request from the second chiplet.

7. The SoC of claim 1, wherein the second chiplet is further configured to:
disable a global counter halt within the second chiplet global counter subsystem, wherein disabling the global counter halt reinitiates counting of a second chiplet global counter within the second chiplet global counter subsystem; and
enable a global counter synchronization path within the second chiplet global counter subsystem, wherein enabling the global counter synchronization path allows the first chiplet global counter subsystem to communicate with the second chiplet global counter subsystem.

8. The SoC of claim 1, wherein:
the first chiplet is further configured to disable a global counter halt within the first chiplet global counter subsystem and the second chiplet global counter subsystem, wherein disabling the global counter halt reinitiates counting of a first chiplet global counter within the first chiplet global counter subsystem and reinitiates counting of a second chiplet global counter within the second chiplet global counter subsystem; and
the second chiplet is further configured to enable a global counter synchronization path within the second chiplet global counter subsystem, wherein enabling the global counter synchronization path allows the first chiplet global counter subsystem to communicate with the second chiplet global counter subsystem.

9. The SoC of claim 1, wherein a sleep clock skew between the first chiplet and the second chiplet equal to or less than two crystal oscillator clock cycles, and wherein the sleep clock is distributed to the first chiplet and the second chiplet in a star configuration.

10. The SoC of claim 1, further comprising:
a third chiplet including a third chiplet global counter subsystem, wherein the interface bus communicatively couples the first chiplet and the third chiplet,
wherein:
the first chiplet is further configured to transmit the global counter synchronization pulse trigger to the third chiplet across the interface bus; and
the third chiplet is configured to load the global counter synchronization value into the third chiplet global counter subsystem at the sleep clock synchronization edge of the sleep clock in response to receiving the global counter synchronization pulse trigger.

11. The SoC of claim 1, wherein the interface bus is a system power management interface (SPMI) bus.

12. A method for global counter synchronization within a multiple-chiplet system, comprising:
supplying, via a power management integrated circuit (PMIC), a sleep clock to a first chiplet and a second chiplet;
transmitting a global counter synchronization pulse trigger from the first chiplet to the second chiplet at a delayed time between a sleep clock synchronization edge and one sleep clock cycle before the sleep clock synchronization edge; and loading a global counter synchronization value into a second chiplet global counter subsystem at the sleep clock synchronization edge of the sleep clock in response to the second chiplet receiving the global counter synchronization pulse trigger.

13. The method of claim 12, further comprising:

reading, by the first chiplet, a first chiplet global counter value from a first chiplet global counter subsystem;

generating, by the first chiplet, the global counter synchronization value based on the first chiplet global counter value;

transmitting the global counter synchronization value from the first chiplet to the second chiplet; and storing the global counter synchronization value in a preload register of the second chiplet, wherein the global counter synchronization value is loaded into the second chiplet global counter subsystem from the preload register.

14. The method of claim 13, wherein the first chiplet global counter value is read from the first chiplet global counter subsystem at a rising edge of the sleep clock.

15. The method of claim 12, further comprising:

determining, by the first chiplet, the sleep clock synchronization edge of the sleep clock, wherein the sleep clock synchronization edge is a rising edge of the sleep clock.

16. The method of claim 12, further comprising:

transmitting the global counter synchronization pulse trigger from the first chiplet to the second chiplet one sleep clock cycle before the sleep clock synchronization edge of the sleep clock.

17. The method of claim 12, further comprising:

transmitting a reset assertion from the first chiplet to the second chiplet; and transmitting a global counter synchronization request from the second chiplet to the first chiplet in response to the reset assertion, wherein transmitting the global counter synchronization pulse trigger from the first chiplet to the second chiplet is in response to the first chiplet receiving the global counter synchronization request from the second chiplet.

18. The method of claim 12, further comprising:

disabling, by the second chiplet, a global counter halt within the second chiplet global counter subsystem, wherein disabling the global counter halt reinitiates counting of a second chiplet global counter within the second chiplet global counter subsystem; and enabling, by the second chiplet, a global counter synchronization path within the second chiplet global counter subsystem, wherein enabling the global counter synchronization path allows a first chiplet global counter subsystem to communicate with the second chiplet global counter subsystem.

19. The method of claim 12, further comprising:

disabling, by the first chiplet, a global counter halt within a first chiplet global counter subsystem and the second chiplet global counter subsystem, wherein disabling the global counter halt reinitiates counting of a first chiplet global counter within the first chiplet global counter subsystem and reinitiates counting of a second chiplet global counter within the second chiplet global counter subsystem; and enabling, by the second chiplet, a global counter synchronization path within the second chiplet global counter subsystem, wherein enabling the global counter synchronization path allows the first chiplet global counter subsystem to communicate with the second chiplet global counter subsystem.

20. A system-on-a-chip (SoC), comprising:

a first chiplet including a first chiplet global counter subsystem;

a second chiplet including a second chiplet global counter subsystem;

means for suppling a sleep clock to the first chiplet and the second chiplet;

means for transmitting a global counter synchronization pulse trigger from the first chiplet to the second chiplet one sleep clock cycle before a sleep clock synchronization edge of the sleep clock; and means for loading a global counter synchronization value into the second chiplet global counter subsystem at the sleep clock synchronization edge of the sleep clock in response to the second chiplet receiving the global counter synchronization pulse trigger.

21. The SoC of claim 20, further comprising:

means for reading a first chiplet global counter value from the first chiplet global counter subsystem;

means for generating the global counter synchronization value based on the first chiplet global counter value;

means for transmitting the global counter synchronization value from the first chiplet to the second chiplet; and means for storing the global counter synchronization value in a preload register of the second chiplet, wherein the global counter synchronization value is loaded into the second chiplet global counter subsystem from the preload register.

22. The SoC of claim 21, wherein the first chiplet global counter value is read from the first chiplet global counter subsystem at a rising edge of the sleep clock.

23. The SoC of claim 20, further comprising:

means for determining the sleep clock synchronization edge of the sleep clock, wherein the sleep clock synchronization edge is a rising edge of the sleep clock.

24. The SoC of claim 20, further comprising:

means for transmitting the global counter synchronization pulse trigger from the first chiplet to the second chiplet at a delayed time between the sleep clock synchronization edge and one sleep clock cycle before the sleep clock synchronization edge.

25. The SoC of claim 20, further comprising:

means for transmitting a reset assertion from the first chiplet to the second chiplet; and means for transmitting a global counter synchronization request from the second chiplet to the first chiplet in response to the reset assertion, wherein means for transmitting the global counter synchronization pulse trigger from the first chiplet to the second chiplet is in response to the first chiplet receiving the global counter synchronization request from the second chiplet.

26. The SoC of claim 20, further comprising:

means for disabling a global counter halt within the second chiplet global counter subsystem, wherein disabling the global counter halt reinitiates counting of a second chiplet global counter within the second chiplet global counter subsystem; and means for enabling a global counter synchronization path within the second chiplet global counter subsystem, wherein enabling the global counter synchronization path allows the first chiplet global counter subsystem to communicate with the second chiplet global counter subsystem.

27. The SoC of claim 20, further comprising:

means for disabling a global counter halt within the first chiplet global counter subsystem and the second chiplet global counter subsystem, wherein disabling the global counter halt reinitiates counting of a first chiplet global counter within the first chiplet global counter subsystem and reinitiates counting of a second chiplet global counter within the second chiplet global counter subsystem; and means for enabling a global counter synchronization path within the second chiplet global counter subsystem, wherein enabling the global counter synchronization path allows the first chiplet global counter subsystem to communicate with the second chiplet global counter subsystem.

28. A method for global counter synchronization implemented by a first chiplet within a multiple-chiplet system, comprising:

receiving, from a power management integrated circuit (PMIC), a sleep clock; and transmitting a global counter synchronization pulse trigger to a second chiplet one sleep clock cycle before a sleep clock synchronization edge of the sleep clock, wherein the global counter synchronization pulse trigger is configured to cause the second chiplet to load a global counter synchronization value into a second chiplet global counter subsystem at the sleep clock synchronization edge of the sleep clock.

29. The method of claim 28, further comprising:

reading a first chiplet global counter value from a first chiplet global counter subsystem;

generating the global counter synchronization value based on the first chiplet global counter value; and transmitting the global counter synchronization value to the second chiplet.

30. A system-on-a-chip (SoC), comprising:

a first chiplet including a first chiplet global counter subsystem;

a second chiplet including a second chiplet global counter subsystem;

an interface bus communicatively coupling the first chiplet and the second chiplet; and a power management integrated circuit (PMIC) configured to supply a sleep clock to the first chiplet and the second chiplet, wherein the first chiplet is configured to:

receive a sleep clock from the PMIC; and transmit a global counter synchronization pulse trigger to the second chiplet one sleep clock cycle before a sleep clock synchronization edge of the sleep clock, the global counter synchronization pulse trigger is configured to cause the second chiplet to load a global counter synchronization value into a second chiplet global counter subsystem at the sleep clock synchronization edge of the sleep clock.

31. The SoC of claim 30, wherein the first chiplet is further configured to:

read a first chiplet global counter value from a first chiplet global counter subsystem;

generate the global counter synchronization value based on the first chiplet global counter value; and transmit the global counter synchronization value to the second chiplet.

* * * * *